United States Patent [19]
Bartholomew et al.

[11] Patent Number: 6,122,255
[45] Date of Patent: Sep. 19, 2000

[54] INTERNET TELEPHONE SERVICE WITH MEDIATION

[75] Inventors: Dale L. Bartholomew, Vienna; Robert D. Farris, Sterling, both of Va.

[73] Assignee: Bell Atlantic Network Services, Inc., Arlington, Va.

[21] Appl. No.: 08/790,888

[22] Filed: Feb. 3, 1997

Related U.S. Application Data

[63] Continuation-in-part of application No. 08/634,543, Apr. 18, 1996, and a continuation-in-part of application No. 08/698,713, Aug. 16, 1996.

[51] Int. Cl.⁷ ............................................ H04J 3/14
[52] U.S. Cl. ..................... 370/237; 370/352; 370/385
[58] Field of Search ................................ 370/352, 351, 370/389, 401, 237, 235, 468, 465, 385; 379/88.17

[56] References Cited

U.S. PATENT DOCUMENTS

| | | | |
|---|---|---|---|
| 4,872,160 | 10/1989 | Hemmady et al. | 370/353 |
| 4,872,197 | 10/1989 | Pemmaraju | 379/93 |
| 4,958,341 | 9/1990 | Hemmady et al. | 370/352 |
| 5,247,571 | 9/1993 | Kay et al. | 379/207 |
| 5,341,374 | 8/1994 | Lewen et al. | 370/450 |
| 5,375,068 | 12/1994 | Palmer et al. | 364/514 C |
| 5,410,754 | 4/1995 | Klotzbach et al. | 370/466 |
| 5,434,913 | 7/1995 | Tung et al. | 379/202 |
| 5,475,732 | 12/1995 | Pester, III | 379/34 |
| 5,490,247 | 2/1996 | Tung et al. | 395/501 |
| 5,493,568 | 2/1996 | Sampat et al. | 370/261 |
| 5,608,786 | 3/1997 | Gordon . | |
| 5,712,907 | 1/1998 | Wegner et al. | 370/238 |
| 5,724,355 | 3/1998 | Bruno et al. . | |
| 5,726,984 | 3/1998 | Kubler et al. . | |
| 5,883,891 | 3/1999 | Williams et al. | 370/356 |
| 5,912,887 | 6/1999 | Sehgal | 370/354 |

Primary Examiner—Huy D. Vu
Attorney, Agent, or Firm—McDemott, Will & Emery

[57] ABSTRACT

A communication network system comprising telephone networks concatenated with a packet switched data internetwork such as the Internet is provided. The network system transports voice signals therethrough while minimizing circuit overload in the telephone network circuits inputting signals to be transported through the internetwork. The telephone networks have a common channel interoffice signaling (CCIS) system using signaling system 7 (SS7) signals. The input load to the internetwork from the telephone systems is monitored by monitoring the control signals in the SS7 network. When an overload condition occurs or appears imminent all or part of the load is switched from the trunk circuits of the telephone network to the SS7 network following protocol translation and multiplexing with the control signals in the SS7 network. Provision is made for insuring excess capacity in the SS7 network before load is transferred.

29 Claims, 19 Drawing Sheets

INTERNET TELEPHONE SERVICE WITH MEDIATION

RELATED APPLICATIONS

This application is a continuation-in-part of U.S. patent applications Ser. Nos. 08/634,543, filed Apr. 18, 1996 and Ser. No. 08/698,713, filed Aug. 16, 1996, in the names of Robert D. Farris et al., for Internet Telephone Service.

This application is also related to application Ser. No. 08/598,767, Analog Terminal Internet Access, filed Feb. 2, 1996, which is a continuation-in-part of applications Ser. Nos. 08/353,281, filed Dec. 5, 1994 (Attorney Ref. No. 680-085); Ser. No. 08/371,906, filed Jan. 12, 1995 Ser. No. 08/539,952, filed Oct. 6, 1995, and Ser. No. 08/557,749, filed Dec. 13, 1995, and to application Ser. No. 08/634,544, Universal Access Multimedia Data Network, filed Apr. 18, 1996, which applications are assigned to the assignee of the instant application. The specifications of those applications are incorporated herein by reference in their entirety.

TECHNICAL FIELD

The present invention relates to methods and system structures for providing public and private telephone service over the Internet and more particularly relates to providing such services through the public telecommunications system including over existing public switched telephone network facilities (PSTN) including existing copper telephone lines.

BACKGROUND

Attention recently has been directed to implementing voice telephone service over the worldwide network now commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

Referring to FIG. 11 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 11 at 410, 412 and 414. The Autonomous Systems (ASs) are linked by Inter-AS Connections 411, 413 and 415. Information Providers (IPs) 416 and 418, such as America Online (AOL) and Compuserve, are connected to the Internet via high speed lines 420 and 422, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 424 and are connected to the AS/ISPs via the same type connections here illustrated as T1 lines 426. Corporate Local Area Networks (LANs), such as those illustrated in 428 and 430, are connected through routers 432 and 434 and links shown as T1 lines 436 and 438. Laptop computers 440 and 442 are representative of computers connected to the Internet via the public switched telephone network (PSTN) are shown connected to the AS/ISPs via dial up links 444 and 446.

The Information Providers (IPs) constitute the end systems which collect and market the information through their own servers. Access providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

U.S. Pat. No. 4,872,197, issued Apr. 21, 1987, to Dorsey et al., titled Verbal Computer Terminal System, describes a system for providing voice telephone access to computers. The system is one wherein remote computers of a conventional type may be addressed or accessed by multiple DTMF telephones and respond or provide output to such telephones in the form of speech derived from the data bases of the respective computers. The system includes means between the standard computer and the DTMF input and analog audio output for emulating computer terminals acceptable to the host computer, for example for converting text data from the computers into speech signals transmissible over telephone line to a caller.

Several providers of Internet telephony software now offer along with the software the use of Internet Phone Servers. These servers, usually in distant cities, are available for users of the software to choose in order to connect to connect to the Internet Phone Network of the particular software provider. In a sense, the servers fulfill the function of a phone directory to access other Internet Phone users. When users of the software connect to the Internet Phone server they are provided with a list of other connected users. From this list a choice may be made and the user can make calls to the other connected parties. In addition to this telephone directory type listing the connected users are also listed under sublists of topics of conversation. Thus the service is similar to the so called "chat rooms" that are available from ISPs for keyboard to keyboard communication. The obvious shortcoming of the service from a telephony standpoint is an inability to make a call to a telephone subscriber who may or may not own a computer or who may not be on line at the time that the calling party desires to establish a contact.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. Nos. 5,434,913, issued Jul. 18, 1995, and 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

As the use of the Internet for a multitude of business and consumer purposes has grown traffic problems and bottlenecks have appeared and increased in seriousness. As the success of commercial Internet Service Providers (ISPs) has expanded their network traffic has grown to the extent that service is slow and detrimental to efficient usage as well as to continued expansion. At the same time that overload has been experienced on the Internetwork side it is now clear that isolated but growing overloading is beginning to occur in the telephone network connection to the ISPs and to routers of the telephone companies providing Internet access. This presents a serious problem to the ability of the consumer to avail themselves of the efficient and economical advantages that the Internet is capable of providing.

Disclosure of the Invention

OBJECTS OF THE INVENTION

It is a primary object of the present invention to provide enhanced access to the Internet through existing public switched telephone network plant, equipment and infrastructure.

It is another object of the invention to provide such service to permit high quality use of the Internet for telephony communication as well as the wide range of other types of Internet data transfer and communication services available.

It is an object of the present invention to provide such telephone service via the Internet to users of the public telecommunications network either with or without access to a computer and with or without separate telephone user access to the Internet.

It is another object of the invention to provide the general public with an economical and convenient telephone service via the Internet without requiring the possession of computing equipment or familiarity with the Internet or its methodology on the part of the user.

It is yet another object of the invention to provide the public with impulse access to the Internet for voice communications without requiring maintenance of a subscription to an Internet access service.

It another object of the invention to provide improved access to the Internet through the public switched telephone network (PSTN) through maximization of the use of the usage of all feasible communication links now existing in the PSTN, including usage of the common channel interoffice signaling (CCIS) network in a unique manner.

It is another object of the invention to provide such access while minimizing or preventing overload in PSTN through the utilization of multiple types of paths through the PSTN with a mediated division of load based on predictive traffic monitoring.

SUMMARY OF THE INVENTION

A public switched telephone network utilizing program controlled switching systems controlled by common channel interoffice signaling (CCIS) and preferably an advanced intelligent network (AIN) CCIS system is arranged in an architecture to provide a methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Billing may be accomplished on a per call basis. The calls may be inter and intra LATA, region or state and may be nationwide. Usage is made of CCIS signaling to set up the call and establish the necessary Internet connections and addressing. Calls may be made from telephone station to telephone station, from voice capable computer to voice capable computer, or from telephone to computer or computer to telephone.

In addition to the foregoing, the invention provides enhanced access to the Internet both over Internet access provided by a telephone company (Telco) over its Internet access via a public switched telephone network, as well as over the access facilities of other Internet service providers. Such enhanced access is obtained through a unique use of the PSTN common channel interoffice signaling (CCIS) network to not only perform its conventional telephone network control function but also to carry communication signals from the Telco connected telephone or other terminal to the Internet server. Thus, in the case of Internet telephony, the CCIS network carries both the normal CCIS packet data signals in addition to packetized voice signals. According to one feature of the invention the telephone load to the Internet servers may be monitored on a continuous basis so as to detect a developing overload condition whereupon the traffic is directed from the voice trunks to the common channel signaling network. However the methodology of the invention is such that the monitoring insures that the CCIS network possesses ample spare capacity before any diversion occurs.

BEST MODE FOR CARRYING OUT THE INVENTION

Modern Public Switched Telephone Networks (PSTNs) are generally implemented using an Advanced Intelligent Network (AIN) type architecture. One example of such an AIN system in a typical PSTN appears in simplified block diagram form in FIG. 2.

In this example central office switches or COs may be located throughout a state. Local telephone lines connect individual telephone stations in each geographic area to the closest central office. Each central office connects via trunk circuits to one or more of the other COs, and each CO has a Common Channel Interoffice Signaling (CCIS) data link to a Signaling Transfer Point (STP). The trunk circuits carry large numbers of telephone calls between the central offices. CCIS data communication is provided via links to signaling transfer points (STPs).

Figure 2:
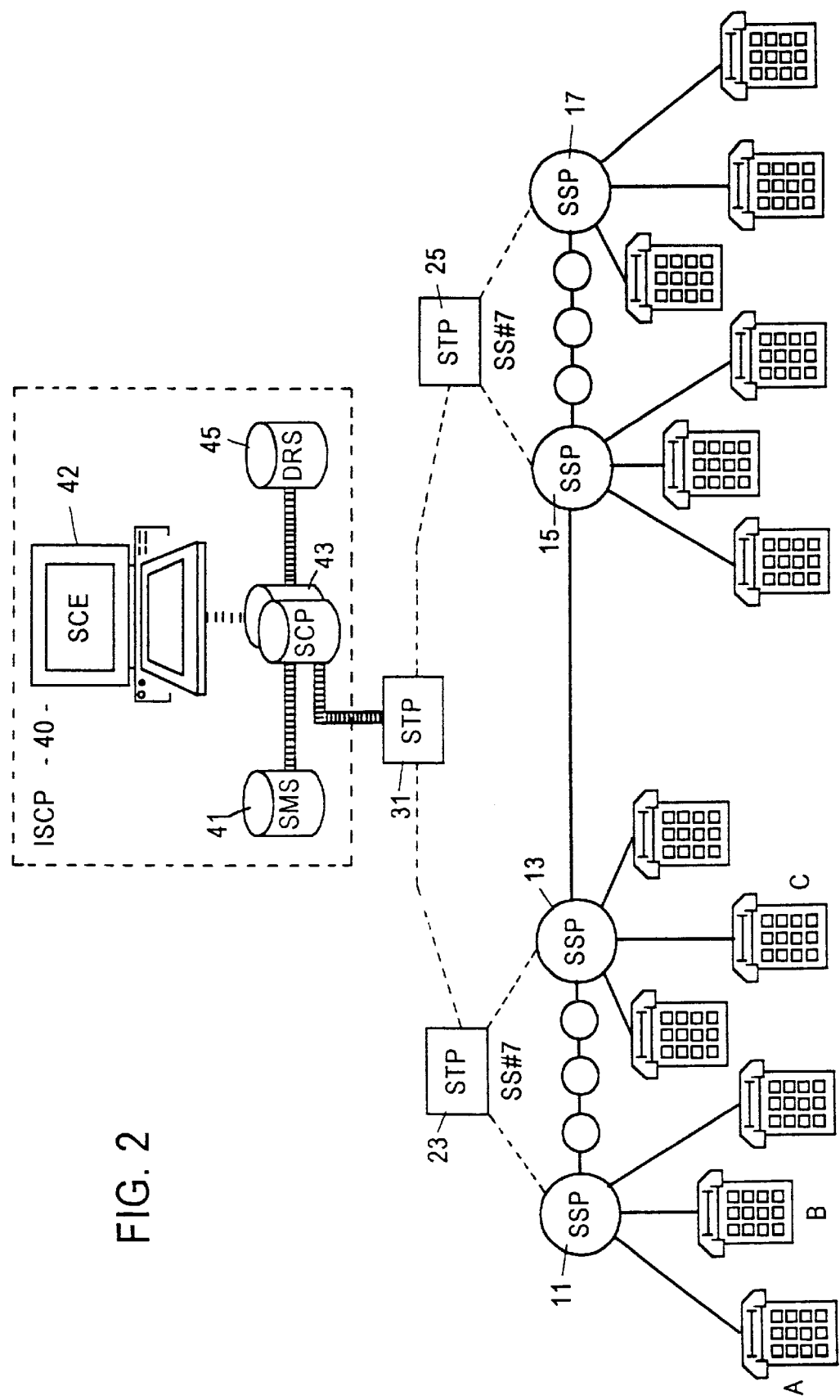
FIG. 2 is a simplified block diagram of a Public Switched Telephone Network (PSTN) having a Common Channel Interoffice Signaling (CCIS) system in the form of an Advanced Intelligent Network (AIN) system.

An AIN PSTN may be implemented with one or more Integrated Service Control Points (ISCPs) per state, as in the FIG. 2 implementation, to avoid overloading existing CCIS data links. Alternatively, the ISCP could be implemented on a LATA by LATA basis or on a regional operating company basis, i.e., one data base for the entire geographic area serviced by one of the Regional Bell Operating Companies. In fact, if federal regulations permitted, the data base service could be nationwide.

Referring to FIG. 2, each of the central offices are labeled as an "SSP." The Service Switching Points, referred to as SSPs, are appropriately equipped programmable switches present in the telephone network, which recognize AIN type calls, launch queries to the ISCP and receive commands and data from the ISCP to further process the AIN calls.

SSPs can be programmed to recognize a number of different triggers as an indication that a call is an AIN call. The trigger can relate to the terminating station or to the identification of the telephone line from which a call or other request for service originates, or to the action to be performed by the SSP. As an example, for providing Area Wide Centrex, a number of lines are designated as members of a business group serviced by the Area Wide Centrex. The SSPs then trigger AIN type servicing based on origination of the call or service request from a line designated as a member of one of the business groups subscribing to Area Wide Centrex. Further explanation of this operation will be found in U.S. Pat. No. 5,247,571, issued Sep. 21, 1993, which is incorporated herein by reference.

As shown in FIG. 2, all of the central offices 11, 13, 15 and 17 are equipped and programmed to serve as SSPs. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSPs. The illustrated embodiment is perhaps an ideal implementation in making each central office an SSP. Other implementations provide the SSP functionality only at selected points in the network, and end offices without such functionality forward calls to one of the SSPs.

The implementation of FIG. 2 includes a number of the SSP capable central office switches, such as the SSPs shown at 11, 13, 15, and 17. The SSP type central offices are each at a different location and distributed throughout the area, region or country served by the system. The SSPs 11 and 13 connect to a first local area STP 23, and the SSPs 15 and 17 connect to a second local area STP 25. The connections to the STPs are for signaling purposes. As indicated by the black dots below STPs 23 and 25, each local area STP can connect to a large number of the SSPs. In FIG. 2 the central offices or SSPs are interconnected to each other by trunk circuits for carrying telephone services.

The local area STPs 23 and 25, and any number of other such local area STPs shown as black dots between STPs 23 and 25, communicate with a state or regional STP 31. The state or regional STP 31 in turn provides communications with the ISCP 40. The STP hierarchy can be expanded or contracted to as many levels as needed to serve any size area covered by the system. The links 23 and 25 between the central offices and the local area STPs are dedicated CCIS links, typically SS#7 type interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 2, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two central offices.

Figure 3:
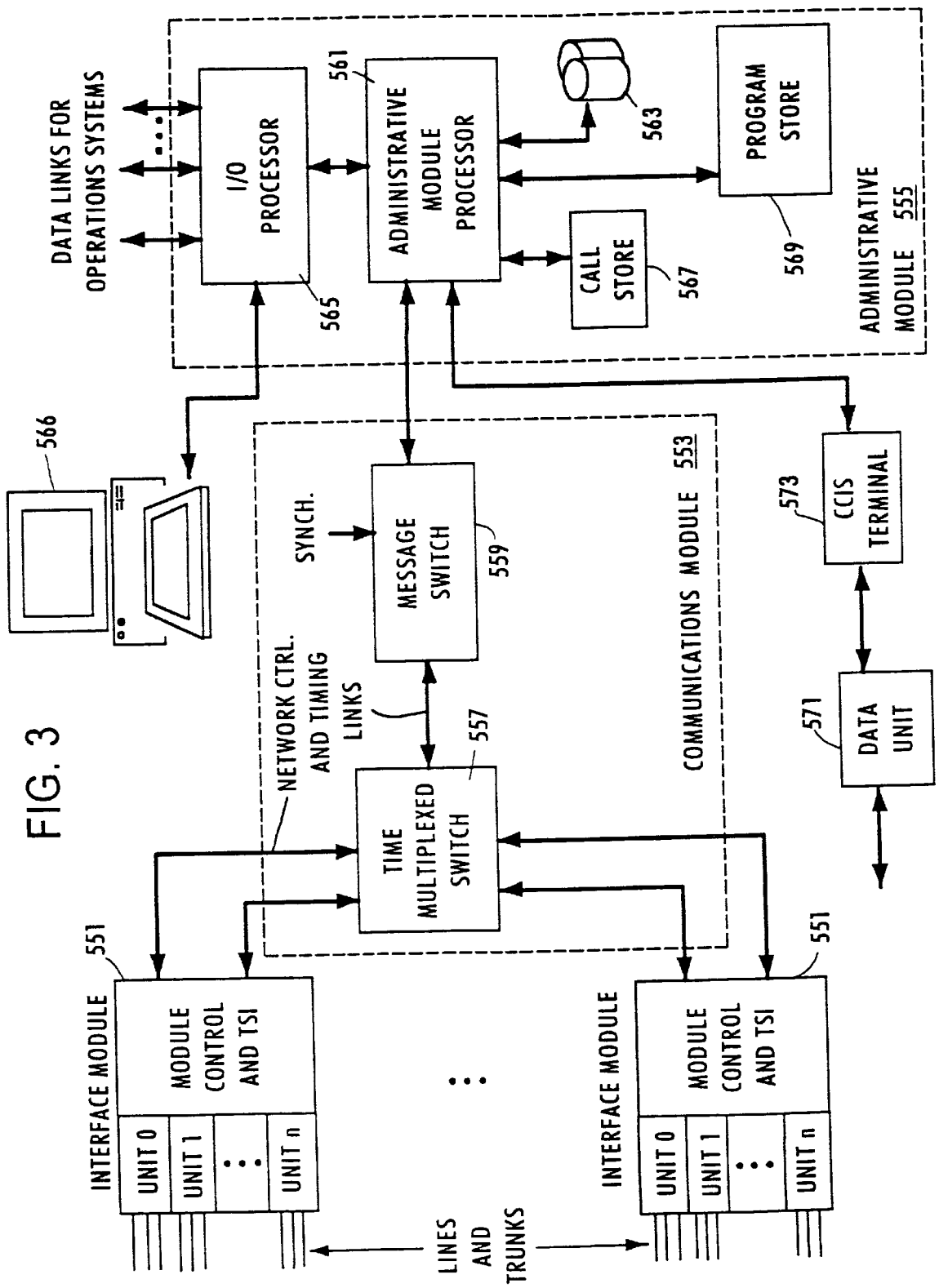
FIG. 3 is a simplified block diagram of an electronic program controlled switch which may be used as any one of the SSP type central offices in the system of FIG. 2.

FIG. 3 is a simplified block diagram of an electronic program controlled switch which may be used as any one of the SSP type central offices in the system of FIG. 2. As illustrated, the central office switch includes a number of different types of modules. In particular, the illustrated switch includes interface modules 551 (only two of which are shown), a communications module 553 and an administrative module 555.

The interface modules 551 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 551 also includes a digital service unit (not shown) which is used to generate call progress tones.

Each interface module 551 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 557 and thence to another interface module (intermodule call connection).

The communication module 553 includes the time multiplexed switch 557 and a message switch 559. The time multiplexed switch 557 provides time division transfer of digital voice data packets between voice channels of the interface modules 551 and transfers data messages between the interface modules. The message switch 559 interfaces the administrative module 555 to the time multiplexed switch 557, so as to provide a route through the time multiplexed switch permitting two-way transfer of control related messages between the interface modules 551 and the administrative module 555. In addition, the message switch 559 terminates special data links, for example a link for receiving a synchronization carrier used to maintain digital synchronism.

The administrative module 555 includes an administrative module processor 561, which is a computer equipped with disc storage 563, for overall control of central office operations. The administrative module processor 561 communicates with the interface modules 551 through the communication module 555. The administrative module 555 also includes one or more input/output (I/O) processors 565 providing interfaces to terminal devices for technicians, such as shown at 566 in the drawing, and data links to operations systems for traffic, billing, maintenance data, etc. A CCIS terminal 573 and an associated data unit 571 provide a signaling link between the administrative module processor 561 and an SS7 network connection to an STP or the like (see FIG. 2), for facilitating call processing signal communications with other central offices and with the ISCP 540.

As illustrated in FIG. 3, the administrative module 555 also includes a call store 567 and a program store 569. Although shown as separate elements for convenience, these are typically implemented as memory elements within the computer serving as the administrative module processor 561. For each call in progress, the call store 567 stores translation information retrieved from disc storage 563 together with routing information and any temporary information needed for processing the call. The program store 569 stores program instructions which direct operations of the computer serving as the administrative module processor.

Figure 4:
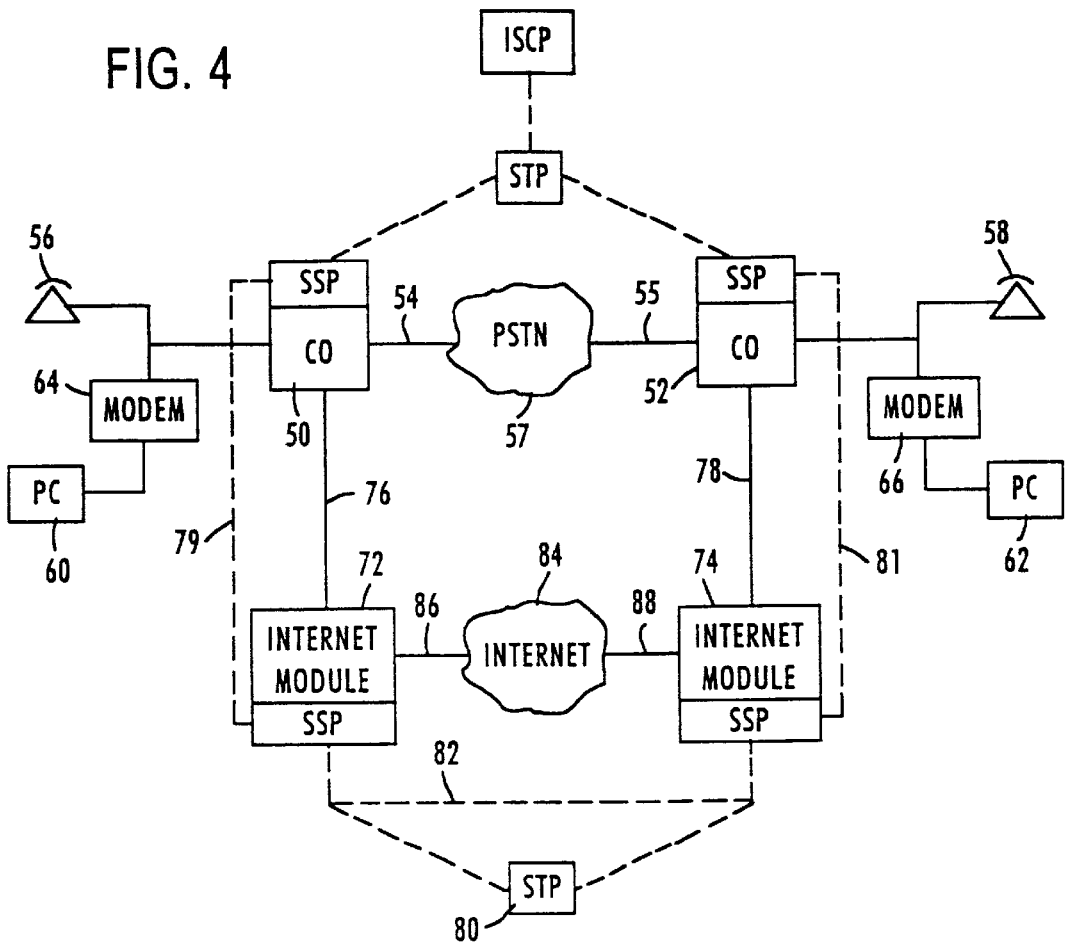
FIG. 4 shows the functional architecture of one embodiment of a network for use in providing telephone service over the Internet using the system and method of the invention.

Referring to FIG. 4 there is shown a simplified block diagram of an AIN controlled PSTN, such as the type shown in more detail in FIG. 2, which includes architecture for implementing one preferred embodiment of the invention. Referring to that figure there are shown two SSP capable central offices 50 and 52 which may be located in the same or different states and regions. These central offices are connected by trunks indicated at 54 and 55 to the PSTN indicated by a cloud 57. Each central office is connected by local loops to subscribers customer premises equipment (CPE) such as telephone terminals 56 and 58. These may be basic instruments for providing Plain Old Telephone Service (POTS). The subscriber premises are also shown as having personal computers (PCs) 60 and 62 connected to the local loops via modems 64 and 66. The SSPs associated with the central offices 50 and 52 are connected by CCIS links to an STP which in turn may be connected to an ISCP. While the STP functionality is here shown as constituting a single STP it will be appreciated that this is for the purpose of simplicity only and that a hierarchy of STPs may be involved.

According to this embodiment of the invention each of the central offices 50 and 52 is provided with an Internet Module here indicated at 72 and 74 connected by T1 trunks 76 and 78. Alternatively the Internet Module hardware may be situated at the central office and associated with the switching system. The Internet Modules may be provided with SSP capabilities and connected into the CCIS network as indicated by the links to the illustrative STP 80. The SSPs serving the Internet Module are inter-connected with the central office SSPs and CCIS network as shown here by illustrative links 79 and 81. The Internet Modules may be linked for signaling purposes by conventional F links indicated at 82. The Internet Modules are connected to the Internet cloud by T1/T3 trunks 86 and 88.

Figure 1:
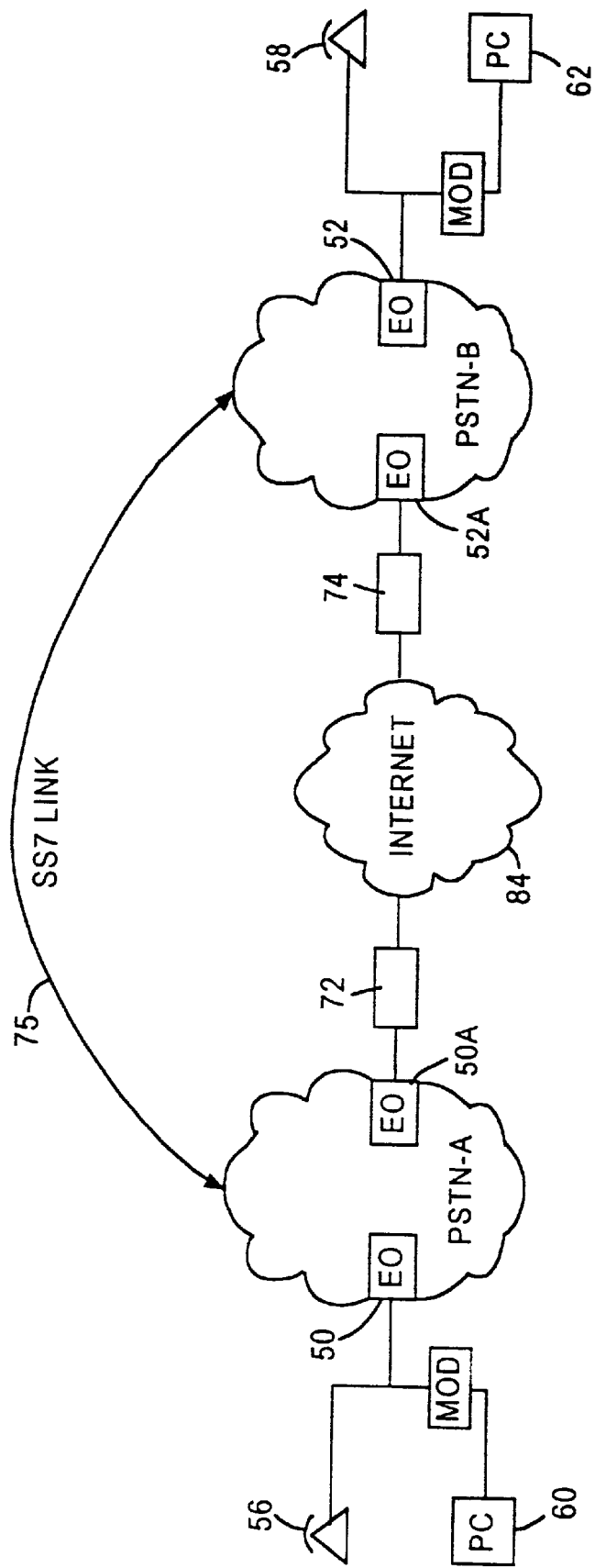
FIG. 1 is a simplified block diagram showing a representation of one combination of the Internet with the facilities of one or more public switched telephone companies in which the new system and method of the invention may be utilized.
Figure 5:
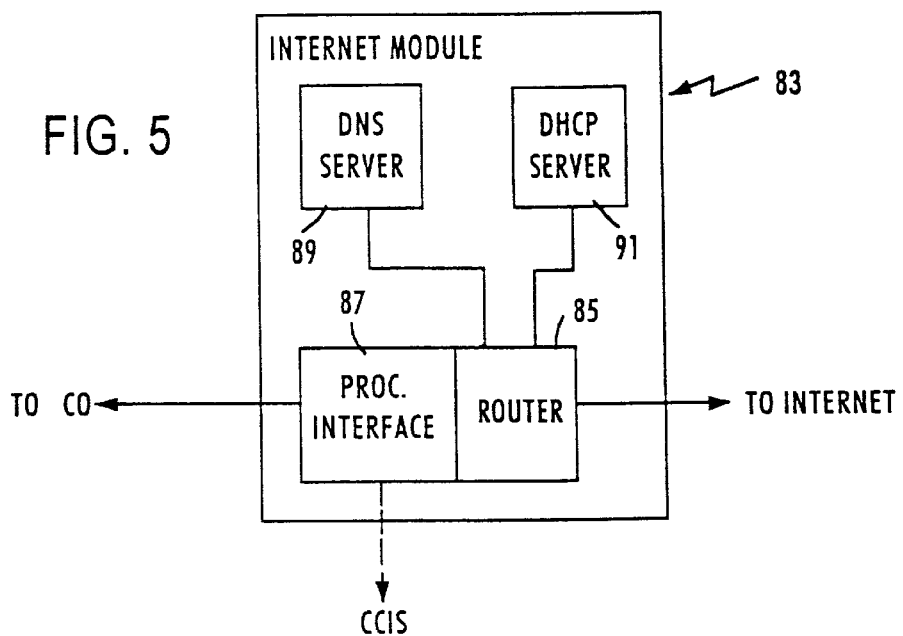
FIG. 5 shows in diagrammatic form the functional architecture of one embodiment of an Internet Module for use in the invention.

The functional architecture of one embodiment of an Internet Module for use in the invention is shown diagrammatically in FIG. 5. The Internet Module, generally indicated at 83, includes a router 85 of the type now generally used in Internet practice, such as shown in FIG. 1 and described in related application Ser. No. 08/634,544 (Attorney Docket No. 680–170) referenced above. For performing some functions according to certain embodiments of the invention the router may be provided with an interface with processing capability as illustratively shown at 87. Connected to the router are a Domain Name Service (DNS) server 89 and a Dynamic Host Configuration Protocol (DHCP) server 91 of the type conventionally used by Internet Service Providers in existing Internet Service. The router interface is connected to the central office and to the CCIS network while the router is connected to the Internet.

Figure 6:
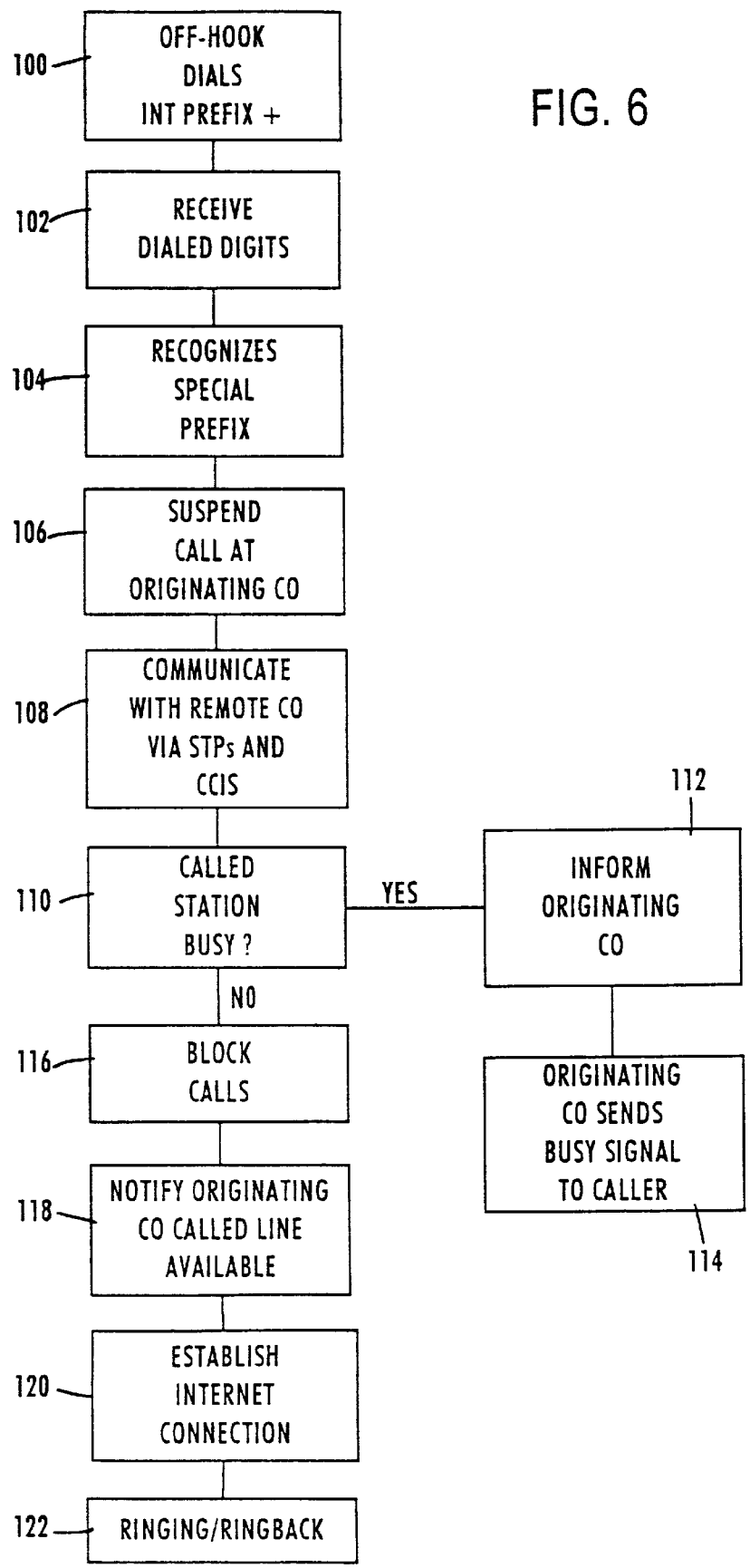
FIGS. 6 and 7 illustrate in simplified flow diagrams one mode of operation of the system of FIG. 4.
Figure 7:
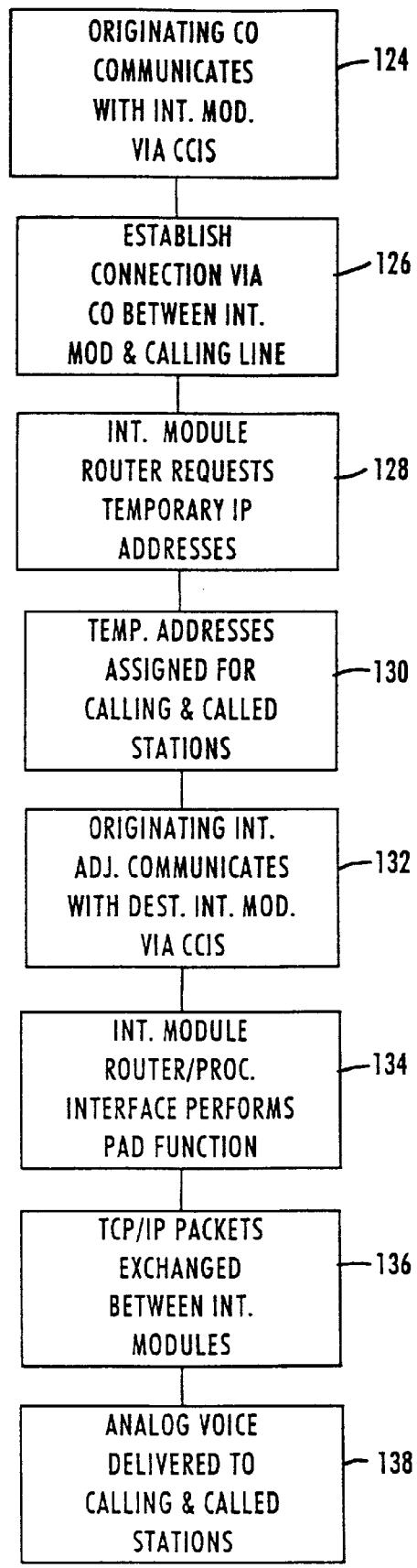

One mode of operation of the system of FIG. 4 is now described in relation to the simplified flow diagrams of FIGS. 6 and 7. According to this embodiment an Internet connection is used to link a calling to a called telephone without the necessity of either party possessing or using personal or office computer equipment. The subscriber in this example uses the POTS station at 56 to initiate an Internet call to a called party at the POTS station 58. The caller goes off-hook and dials *82. This prefix has been established by the Telco offering the service as a predesignated prefix with which the public may initiate an Internet telephone call. The dialing of the prefix *82 is followed by the dialing of the directory number of the called party at the station 58.

As is illustrated in the method shown in FIG. 5, the calling party goes off-hook and dials the prefix *82 at 100. At 102 the central office switching system responds to an off-hook and receives the dialed digits from the calling station. At 104 the central office switching system analyzes the received digits and determines from the prefix *82 that the call is an Internet call. Responsive to its programming it knows that the call must be completed through a remote central office and that further processing is necessary. At 106 the local or originating central office suspends the call and at 108 sends a CCIS query message through one or more of the STPs.

The query message goes to the central office to which the called station is connected. The receiving or destination central office receives the query and determines at 110 whether or not the called station at 58 is busy. If the called station is busy, the receiving central office so informs the originating central office at 112. At 114 the originating central office provides a busy signal to the calling station.

If the called station is not busy, the receiving central office busies out the called station line by blocking all calls at 116. The receiving or destination central office then informs the originating central office that the called line is available and waiting at 118 and that the processor in the Internet Module associated with the central office 52 is available.

An Internet virtual connection is then established between the calling and called stations at 120 as presently will be described in detail. The receiving or destination central office provides a ringing signal to the called station and the originating central office sends ringback tone back through the local loop to the calling station at 122. When the called station goes off-hook and the Internet virtual connection is completed the conversation via the Internet can commence.

Referring next to the flow diagram in FIG. 7 one embodiment of the set up of the Internet connection is now described. When the originating central office receives from the destination central office the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. This CCIS or SS7 communication between the originating central office and the originating Internet Module is indicated at 124. When the originating central office receives the message that the addresses have been assigned the switching system connects the originating local loop to the Internet Module 72. This connection is indicated at 126.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing embodiments of the initial connection steps, the Internet Module router 85 in the Internet Module 72 sends a request for the assignment of temporary IP addresses for the two directory numbers to the DHCP server 91 as indicated at 128. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned at 130. At 132 originating Internet Module 72 triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module the address may be obtained at the receiving central office switching system and its associated Internet Module and communicated to the originating central office switching system via the common channel signaling link.

As the conversation commences the originating Internet Module 72 is receiving from the originating central office 50 over the trunk connection digitized speech in DS0 format. The Internet Module implements the function of a packet assembler and disassembler or PAD and assembles packets in TCP/IP format. This is indicated at 134. The packets bear the source and destination IP addresses and the digitized speech payload. The packets are dispatched from the originating router 85 onto the Internet and are delivered to the destination router and Internet Module 74. The receiving router and associated processor have the directory number of the called party and the matching IP address which were obtained via CCIS signaling from the originating router as indicated at step 132 described hereinabove.

The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal. The packet exchange is indicated in FIG. 7 at 136. The two way transfer of voice signals is indicated at 138.

Upon the establishment of the line/trunk connection to the Internet Module the originating central office may send billing information to the switch journal which indicates that an Internet call has been initiated and that may be recorded in the conventional manner. The DHCP server may also incorporate a billing capability which may be utilized as an alternative to journal billing if desired. Thus the DHCP server may initiate a clocking mechanism upon the assigning of the IP addresses to start the clock for charging the customer. When the IP address is released tolling of the charge ceases with a time based stamping attributed to the IP assignment.

Figure 8:
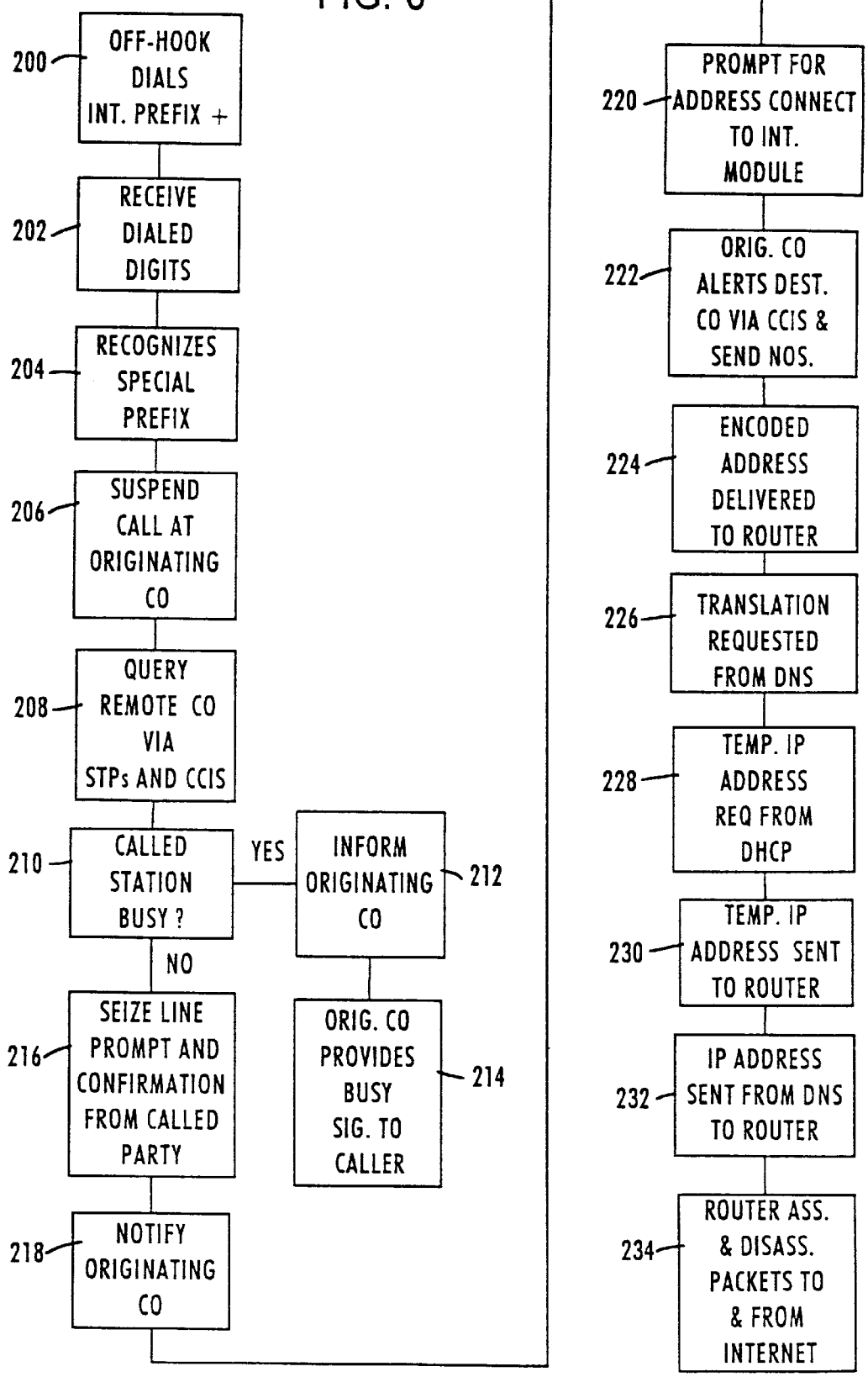
FIG. 8 illustrates another mode of operation of the system of FIG. 4 in simplified flow diagram form.

Another mode of operation of the system of FIG. 4 is now described in relation to the simplified flow diagram of FIG. 8. A customer using the POTS station at 56 as an originating station desires a voice connection to a called party on the premises of the POTS station 58. The calling party is aware that the proposed called party has at those premises a personal computer with voice capabilities and has knowledge of the Internet domain or hostname address of the proposed called party.

The Telco offering the service of the invention has established a prefix *82 for a telephone to telephone call as has been described in the previously discussed example. In this embodiment the Telco also establishes a second prefix *83 for voice communication from telephone to a voice capable computer possessing an Internet address. The communication establishment is here commenced by the calling party going off-hook and dialing the prefix *83 at 200.

At 202 the central office switching system at the originating central office responds to an off-hook and receives the dialed digits from the calling station. At 204 the central office switching system analyzes the received digits and determines from the prefix *83 that the call is an Internet call from a telephone station caller to a computer terminal at the customer premises of the called party. Responsive to its programming the originating office switching system knows that the call must be completed through a remote central office and that further processing is necessary. At 206 the local or originating central office suspends the call and at 208 sends a CCIS query message through one or more of the STPs.

The query message goes to the central office to which the called station is connected as determined by the called directory number that was dialed by the caller. The receiving or destination central office receives the query and determines at 210 whether or not the local loop to the premises of the station at 58 is busy. If the called local loop is busy, the receiving central office so informs the originating central office at 212. At 214 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. This is shown at step 216. A distinctive ring may be used in lieu of the prompt or together with the prompt to alert the receiving party that a telephone call is arriving via the Internet and that it will be handled by microphone and speaker associated with the sound card in the called party's computer.

The receiving or destination central office then informs the originating central office that the called line is available and that the computer is waiting at 218. As an alternative to this procedure the destination central office may alert the called computer by applying an alert signal between the tones of the ringing signal.

The originating central office issues a voice prompt to the calling party requesting that party to spell out the domain or hostname of the called party and immediately completes the trunk connection from the originating central office to the originating Internet Module. This step is shown in FIG. 8 at 220. Simultaneously the originating central office alerts the originating Internet Module that a domain or hostname call has been initiated and sends the directory numbers of the calling and called party. This parallel step is indicated at 222.

Figure 9:
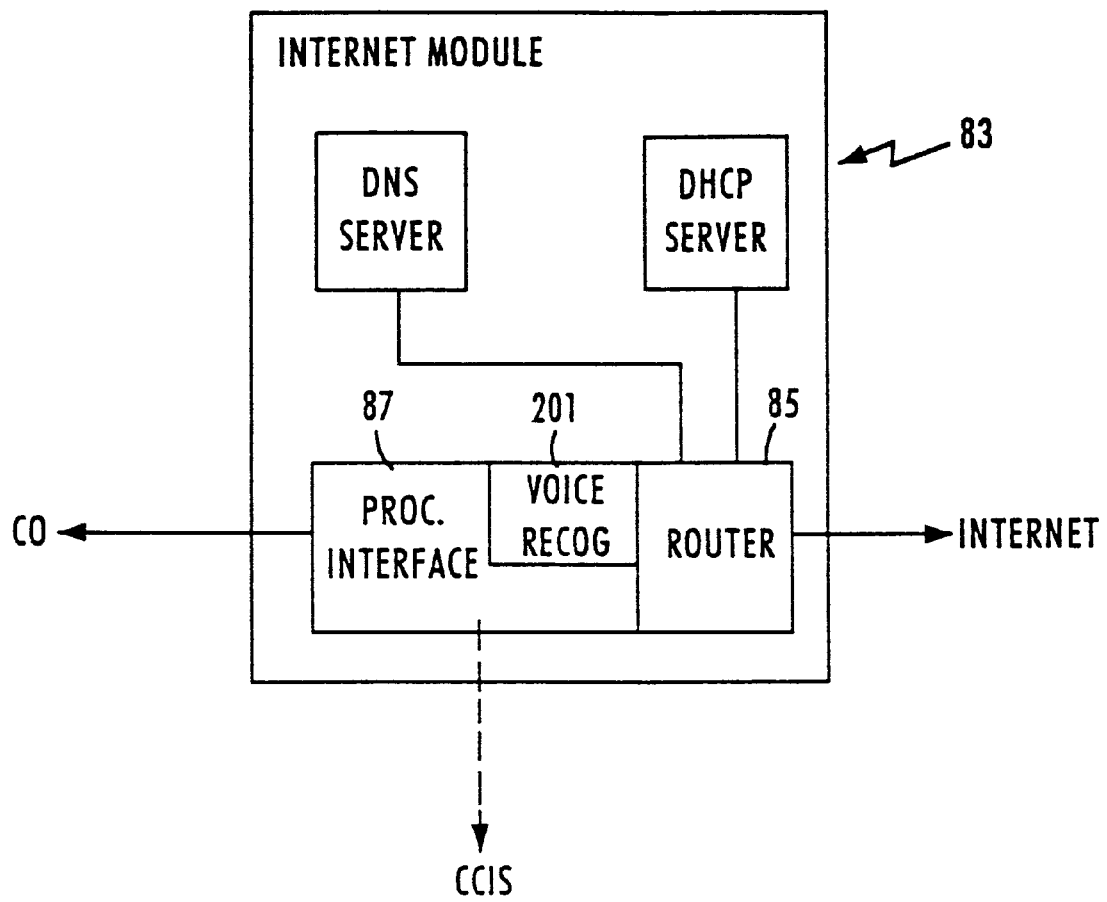
FIG. 9 illustrates in block diagram form another embodiment of an Internet Module for use in the invention.

In this embodiment of the invention the Internet Module is provided with a processor interface to the router which includes a voice recognition card to translate the incoming address to a TCP/IP format signal. An Internet Module of this type is illustrated in FIG. 9 where the voice card is shown at 201. The arriving address signal is delivered by the voice card and processor interface to the router 85. This step is shown at 224 in FIG. 8.

The router requests a domain name translation from the DNS server 89. This is indicated at step 226. At substantially the same time the router broadcasts a request for a temporary IP address for the calling directory number. This is indicated at step 228. The DHCP server provides the caller with a temporary IP address from the pool of addresses supplied by the Internet Service Provider which in this case is the Telco. The DHCP server selects an address from the pool and sends the address to the router at 230.

The Domain Name Service (DNS) server provides the translation from the domain or host name supplied by the caller into an IP address. Since each site maintains its own server no single site on the Internet is in possession of all of the translation data. The overall data constitutes a distributed database and relies on the servers at the individual sites. Access to the DNS is through a resolver and software library functions. The function in this case takes a domain name or hostname and returns an IP address. The functionality also is capable of providing the inverse function of taking an IP address and returning a hostname.

The IP address is sent by the DNS server to the router for incorporation into the packets to be assembled and dispatched onto the Internet. This step is shown at step 232. The router and its processor interface again serve a PAD function and transmit and receive TCP/IP packets to the Internet. This is indicated at 234.

In this embodiment of the invention the originating Internet Module and its processor interfaced router perform the functions of signal compression and expansion as well as packet assembly and disassembly (PAD). Thus the incoming DS0 signals from the originating central office are compressed from the 64 kbs DS0 rate to a 28.8 kbs modem rate assembled into TCP/IP protocol. The TCP/IP signals are transmitted via the Internet to the destination Internet Module 74. In this case the destination Internet Module may deliver the incoming TCP/IP signal direct to the computer modem 66. The voice communication may continue between the caller using the telephone station at 56 and the called party using the called computer at 62.

Figure 10:
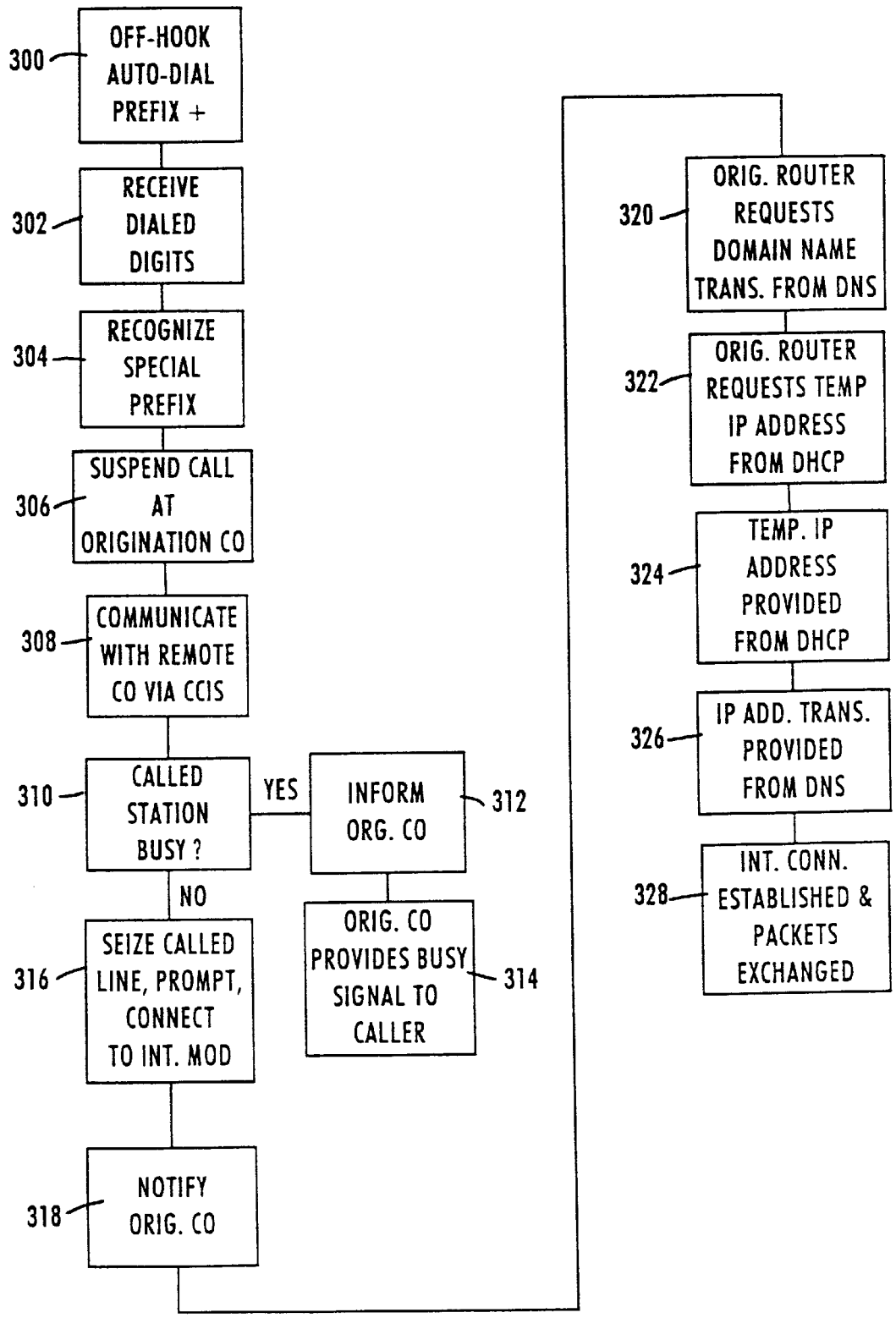
FIG. 10 shows a still further mode of operation of the system of the invention in simplified flow diagram form.
Figure 11:
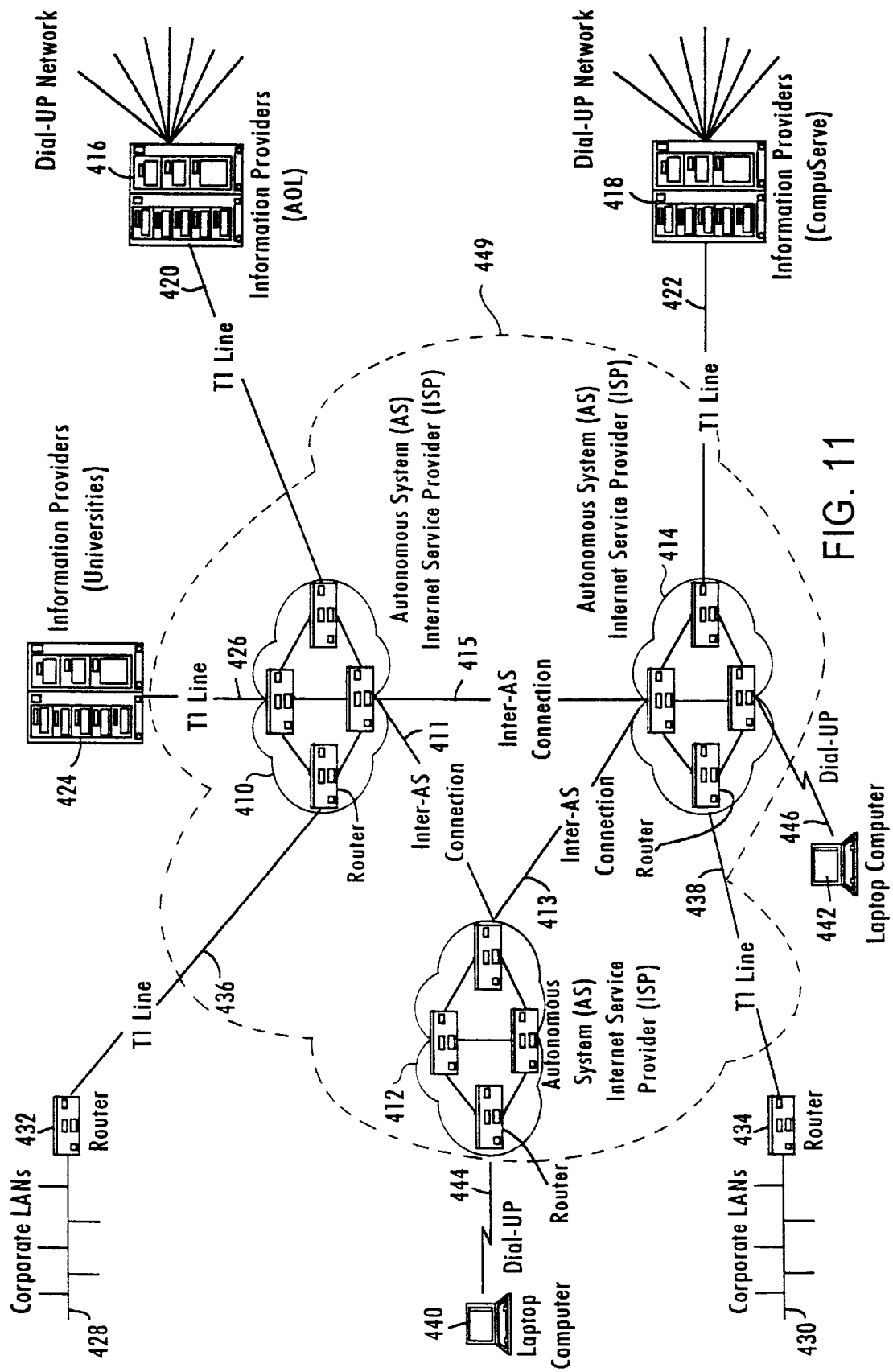
FIG. 11 is a simplified diagram of the Internet.

A still further mode of operation of the system of the invention is now described in relation to the simplified flow diagram of FIG. 10. According to this mode a voice connection may be established between a calling computer which may not have Internet access or an Internet address.

At 300 in FIG. 10 the calling PC 60 having voice functionality auto-dials the designated prefix which in this case may be *64. In addition to the prefix the computer dials the directory number of the called party and the domain or hostname of the called CPE computer.

At 302 the central office switching system at the originating central office responds to the off-hook and receives the dialed digits from the calling station. At 304 the central office switching system analyzes the received digits and determines from the prefix *84 that the call is an Internet call from a computer station caller to a computer terminal at the customer premises of the called party. Responsive to its programming the originating office switching system knows that the call must be completed from a local computer through a remote central office and that further processing is necessary. At 306 the local or originating central office suspends the call and at 308 sends a CCIS query message through one or more of the STPs.

The query message goes to the central office to which the called station is connected as determined by the called directory number that was dialed by the caller. The receiving or destination central office receives the query and determines at 310 whether or not the local loop to the premises of the computer 62 is busy. If the called local loop is busy, the receiving central office so informs the originating central office at 312. At 314 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. The trunk connection from the destination central office to the destination Internet Module is completed. This is shown at step 316.

A distinctive ring may be used in lieu of the prompt or together with the prompt to alert the receiving party that a telephone call is arriving via the Internet and that it will be handled by microphone and speaker associated with the sound card in the called party's computer. As a still further alternative the destination central office may send a wake-up or alerting signal to the called computer between the ringing signals. The receiving or destination central office then informs the originating central office that the called line is available and that the computer is waiting at 318.

The router at the originating Internet Module requests a domain name translation from the DNS server 89. This is indicated at step 320. At substantially the same time the router broadcasts a request for a temporary IP address for the calling directory number. This is indicated at step 322. The DHCP server provides the caller with a temporary IP address from the pool of addresses supplied by the Internet Service Provider which in this case is the Telco. The DHCP server selects an address from the pool and sends the address to the router at 324.

The Domain Name Service (DNS) server provides the translation from the domain or host name supplied by the caller into an IP address. This IP address is supplied to the router and its associated processor interface at 326. The router is now in possession of the necessary information to perform it PAD function upon the data received from and delivered to the calling computer 60. The Internet connection or virtual connection is established at 328 and the voice communication from computer to computer may proceed.

While this illustration of computer to computer voice connection involved a calling computer without an Internet address and a called computer with an Internet address it will be obvious to those skilled in the art that the described methodology is also applicable to set ups where neither party has an Internet address as was the case with the telephone to telephone Internet connection.

Referring to FIG. 1 there is shown a variation of the depiction of the Internet and telephone networks earlier described in relation to FIG. 4. In FIG. 4 the Internet is depicted as connected to telephone subscriber stations 56 and 58 directly through central offices 50 and 52 and Internet modules or servers 72 and 74. As originally stated, this was done for convenience of illustration through simplification. In practical fact the central offices 50 and 52 represent telephone networks containing numerous central office and other switches between the end points of connection. FIG. 1 illustrates this fact by showing the same telephone subscriber stations 56 and 58 as connected to central office switching systems 50 and 52 as constituting input/output end office switching systems or end offices for the telephone networks depicted as clouds PSTN-A and PSTN-B. The connections to the servers 72 and 74 are shown as the other input/output end office switching systems 50A and 52A for the clouds PSTN-A and PSTN-B. In between central or end offices 50 and 52A in PSTN-A and in between central or end offices 52 and 52A in PSTN-B are telephone networks of the type shown and described in connection with FIG. 2. As previously described, each of these networks includes voice lines and trunks connecting the various SSPs or switches, in addition to data links connecting to the common channel signaling data network. These networks include the STPs and ISCP which implement the control signaling which controls the trunked networks.

During periods of voice network congestion or traffic overload it is generally the trunked networks in the telephone portion of the overall Internet-PSTN combination which become overloaded. According to the present invention this overload situation may be avoided by utilizing the common channel interoffice signaling (CCIS) network to carry the overload as well as continue to perform its conventional signaling and control function. This is accomplished according to the invention without unintentionally creating a congestion condition in the CCIS network. A clear understanding of the manner in which this may be accomplished is facilitated if prefaced by a more detailed description of the construction and operation of the common channel interoffice signaling network. To this end attention is directed to FIGS. 12–14.

The most used system for providing a Common Channel Signaling Network (CCSN) in an Advanced Intelligent Network (AIN) utilizes Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP's) used to permit line identification database (LIDB) look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

Figure 12:
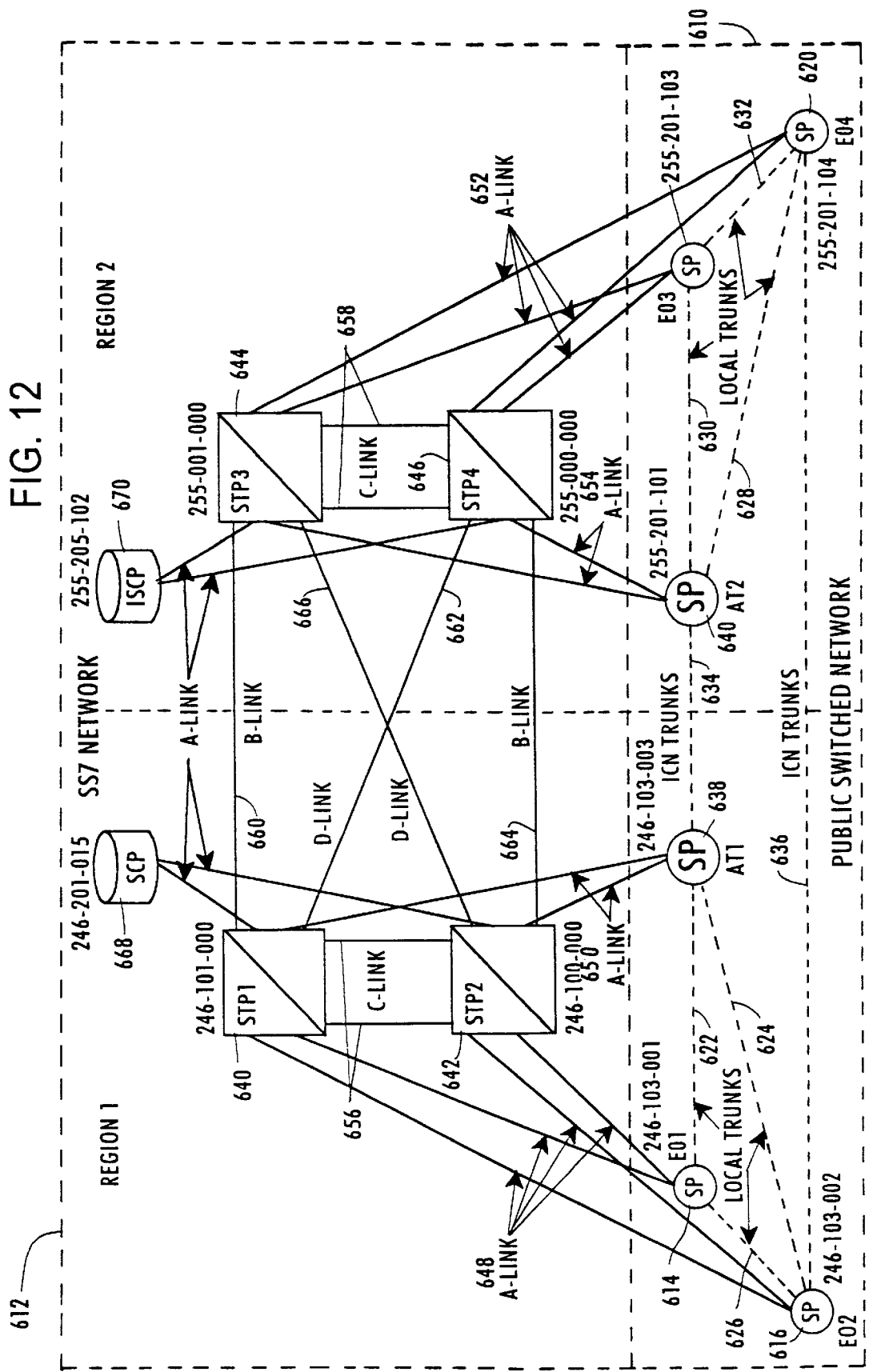
FIG. 12 is a block diagram of a Public Switched Telephone Network and its SS7 CCIS control network.

Referring to FIG. 12 here is shown a block diagram of a public switched telephone network and the SS7 network that is used to control the signaling for the switched network. Thus an analog switched telephone network is generally indicated at 610 having a common channel signaling network in the form of an SS7 network illustrated generally at 612. The switched telephone network consists of a series of central offices which are conventionally referred to as signaling points (SPs or SSPs) in reference to the SS7 network. Certain of these SPs comprise end offices (EOs) illustrated at 614, 616, 618 and 620 as EOs 1–4 in FIG. 12. Each signaling point has a point code comprising a 9-digit code assigned to every node in the network. In FIG. 12 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company, while end offices EO3 and EO4 represent end offices of the region of a different operating company. Each operating company has its own network ID, shown here as 246 for the left region and 255 for the right region in FIG. 12. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint. The broken lines connecting the SPs together may be analog trunks or voice or similar circuits. The SPs in a given region are connected together by local trunks 622, 624 and 626 in the left region and 628, 630 and 632 in the right region. The SPs in one region are connected to the SPs in other regions via inter-exchange carrier network trunks or ICN trunks 634 and 636 in FIG. 12 connected to Access Tandems (ATs) 638 and 640 (AT1 and AT2). These SPs or ATs are shown as having point codes 246-103-003 and 255-201-101 respectively.

Referring to FIG. 12, the SS7 network 612 comprises a series of Signal Transfer Points (STPs) shown here at 640, 642, 644 and 646 designated STP1, STP2, STP3 and STP4. Each STP in a network is connected to the SPs in the network by A links indicated at 648, 650, 652 and 654. STP1 and STP2 constitute a mated pair of STPs connected by C links 656 while STP3 and STP4 constitute a mated pair connected by C links 658, each mated pair serving its respective transport area. It will be understood that there may be multiple mated pairs per region, one for each designated transport area. STP1 is connected to STP3 by B link 660 and to STP4 by D link 662. STP2 is connected to STP4 by B link 664 and to STP3 by D link 666.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 1 as an SCP 668 and an ISCP 670. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 662 to STP4 to EO4, and so forth. In the event that a link between STP3 and EO4 was lost, an SS7 route could be established from EO2 to EO4 via STP1 to STP3 and then via C link 658 to STP4 to EO4. However, that would be an undesirable route in unnecessarily using the C link. A links provide direct connectivity while C links provide circuitous routes using extra switches, a situation to be avoided. An alternate route would be from STP1 via D link 662 to STP4 to EO4. Another reason for not using the C link is to avoid tying up the entire STP3-STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Part (SCCP) message, which is a database request. This point code has a destination point code of an alias which is the point code of STP1 and STP2. STP1 and STP2 have various point codes indicated in FIG. 12 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN. It is these databases which are utilized for the purposes of the present invention.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. The SS7 messages traverse the network at all times. The messages themselves comprise digital serial messages of various length that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Figures 13, 14:
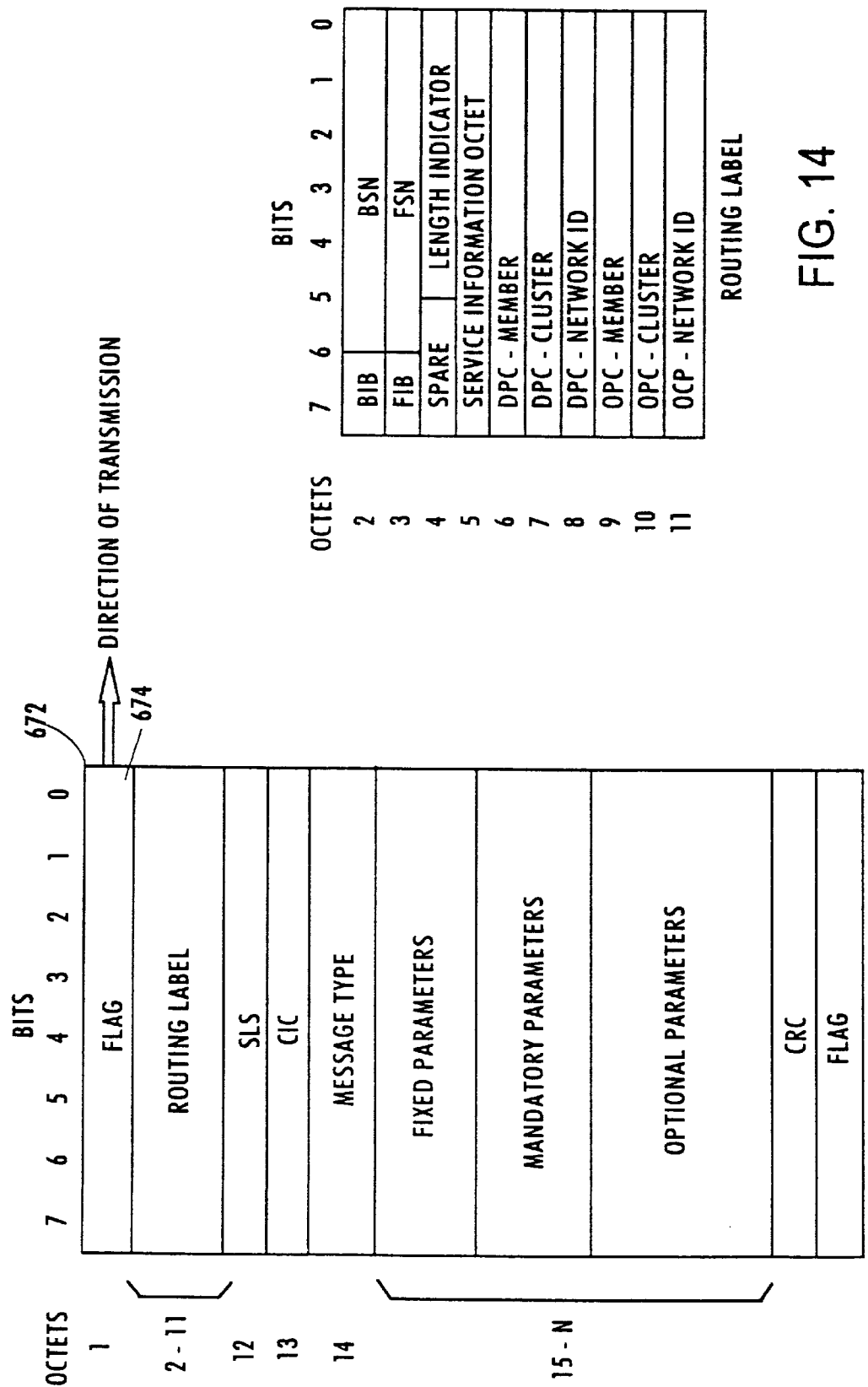
FIGS. 13 and 14 illustrate in graphic and tabular form the protocol of an SS7 data signal.

Referring to FIGS. 13 and 14, the start of a message is indicated at 672 with the commencement of the flag 674.

The first 7 bits following the flag constitute the Backward Sequence Number (BSN). The eighth bit is the backward indicator bit which is used to track whether messages have been received correctly. The backward sequence number was the forward sequence of the other node's message when it was sent. Referring to FIG. 12, if EO2 sends a message to EO4, EO2 s include a Forward Sequence Number (FSN) in the 3rd octet of its message. Upon receiving this message, EO4 will include a Backward Sequence Number (BSN) equal to the FSN sent in the previous message in its next message to EO2. This indicated to EO2 that EO4 received the first message. This constitutes a positive acknowledgment of receipt of a message. If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are used for setting up calls or 800, LSSUs are used for alignment, and FISUs are fill in signals. Thus an LSSU is seen only if the link is out of service and going back into service or going out of service.

Octets 6-11 contain the point codes. Thus the point code 235-81-8198 is the point code which would be read in FIG. 3. This is backwards as it comes from the message which arrives number, cluster, network ID in the order of bits received. That constitutes the routing label telling the STP and the nodes where the message came from and where it is going. Other parameters are involved depending upon the kind of message. If this were a FISU, that would be it. There would be 16 other bits that have Cyclic Redundancy Codes (CRCs) in them and another flag which would constitute the end. CRCs constitute a further error detection code which is a legal 1 function in the protocol. From the foregoing it will be seen that the messages contain various fields. This describes the basic format of an SS7 message which is the same for all messages of the same type.

The SS7 protocol consists of four basic subprotocols:

Message Transfer Part (MTP), which provides functions for basic routing of signaling messages between signaling points.

Signaling Connection Control Part (SCCP), which provides additional routing and management functions for transfer of messages other than call set-up between signaling points.

Integrated Services Digital Network User Part (ISUP), which provides for transfer of call set-up signaling information between signaling points.

Transaction Capabilities Application Part (TCAP) which provides for transfer of non-circuit related information between signaling points.

Figure 15:
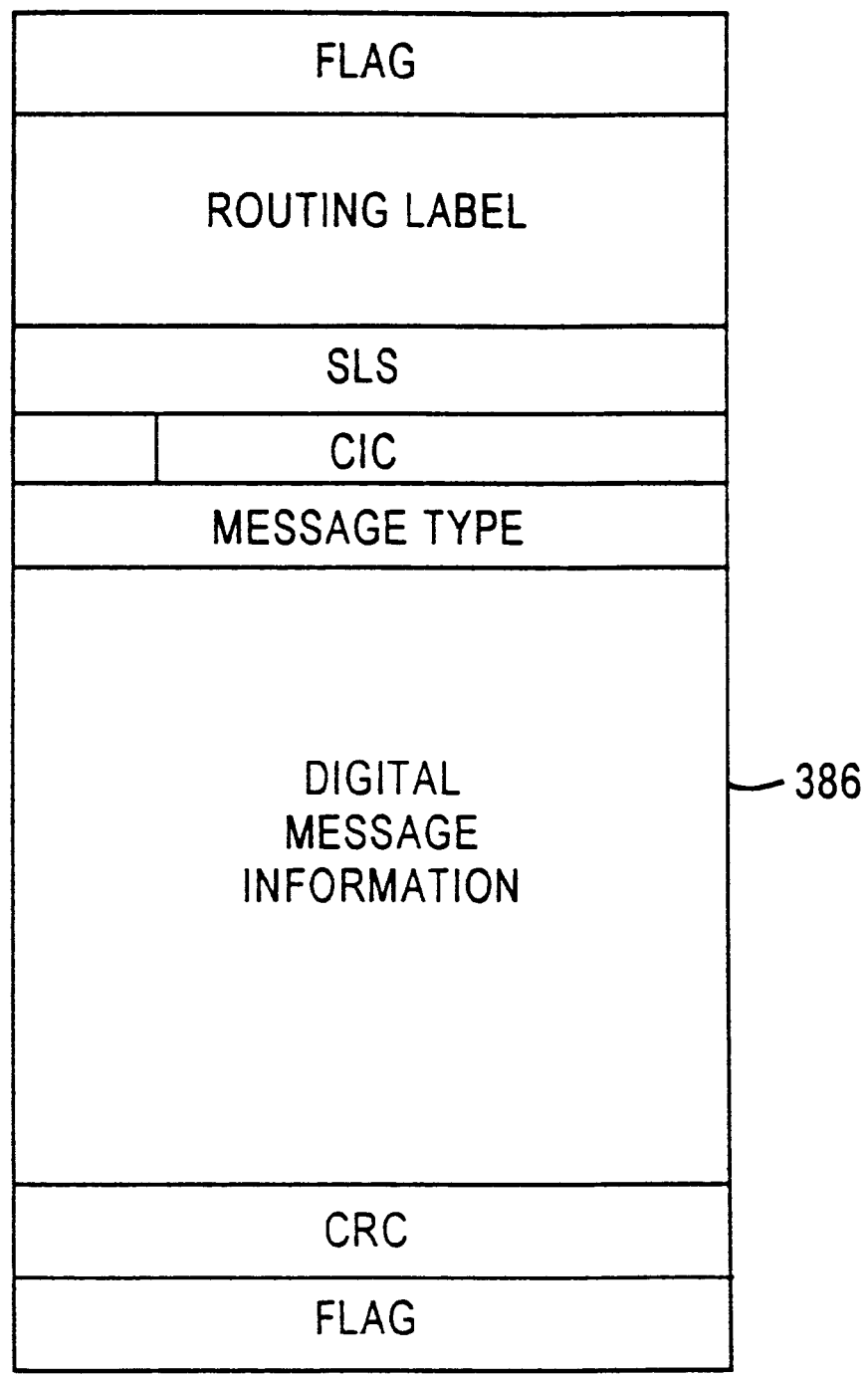
FIG. 15 illustrates a packet carrying digital message, which may constitute voice information, according to the invention.

As is described in detail in the common assignee's above identified pending application Ser. No. 08/353,281, filed Dec. 5, 1994, and continuation cases above identified, it has been discovered by the applicants that digitized voice may be transported in TCAP format in SS7 signals. It has further been discovered by the applicants that such SS7 voice transport may be carried out in substantially real time. It is a basic purpose of this invention to relieve traffic congestion in use of the Internet through telephone network access by diverting part or all of the traffic from the trunked telephone network to the CCIS network. The analog voice signal entering end office 50 in FIG. 1 is conventionally transformed in the switching system to a digital format and transported in that format through the trunked network of PSTN-A to the end office 50A. In order to relieve or prevent traffic overload according to the present invention those signals in whole or in part are transported via the CCIS SS7 network in PSTN-A. The digitized voice is packetized by the end office SSP 50 with an appropriate routing label and handling instructions as presently is described in further detail. The packets are then dispatched through the CCIS network to the end office SSP 50A. An illustrative packet is shown in FIG. 15 with the digital message information incorporated at 686. The information may be in DS0/T1 protocol which is conventionally the output digital signal. The number of SS7 packets which may be required will be dependent upon the length of the message as in conventional packet communication. Each packet includes suitable header information in the conventional manner. In this case the identity of the destination SSP and as well as the destination server or router 72 is established by the ISCP in the CCIS network, and that identity will be included in the outgoing packets.

The dispatched SS7 packet communication proceeds through the common channel signaling SS7 network until all of the packets are received at the destination. It is a feature of the invention that the redundancy of the SS7 network and packet switching techniques permits packets traveling different routes to the same destination. This redundancy is utilized as a feature of the invention to enable to existing SS7 network to handle the digital packet communication involved and ameliorate or eliminate traffic overload without requiring modification of the SS7 system. The SS7 network has been designed to perform its conventional signaling function while utilizing no more than approximately fifty percent of the network capacity. It is a feature of the invention that the existence of such spare capacity is determined before diverting voice or other trunk signals into the CCIS SS7 network.

When the packets are received by the end office SSP 50A they are depacketized, translated, and delivered to the Internet server 72. If the server 72 is of the type described above in connection with FIGS. 5 and 9, those servers process the signal in the manner described above. If the server 72 is that of an ISP they are processed in the conventional manner and dispatched over the Internet 84. At the exit or right side of the Internet in FIG. 1 and the PSTN-B, the inverse of the processing just described occurs and an analog voice signal is delivered to the distal telephone station 58.

It will be appreciated that the system and method of the invention provides a significant degree of solution to the telephone network congestion or traffic overload problem by opening an entirely new traffic path to carry the load. The amount of traffic diverted may vary between all or none depending on fixed or dynamic parameters which may be designed into the network for automatic or manual actuation. The load condition in the CCIS network is monitored prior to the time that traffic is diverted thereby preventing overload of the critical CCIS network.

According to this embodiment of the invention there is provided a system and method for utilizing the SS7 or common channel signaling network to detect predetermined events and the imminence of predetermined events and then block or control those events from their incipiency. In this case it is desired to divert or redirect calls to a predetermined destination, such as an Internet server, when the rate of call attempts or calls exceed a specified parameter. One example of such a parameter may be the number of specified occurrences per time period (minute or fraction thereof, hour, etc.). This is accomplished utilizing the CCIS or SS7 network in conjunction with programmable monitors associated with the CCIS links connected to the STPs and control processors for those monitors. According to the invention these monitors are programmed to trap and temporarily record predetermined CCIS signaling data such as call set up messages, associated with specific events, which it is desired to block or control. Call-setup messages utilize a call-setup protocol known as the Integrated Services Digital Network (ISDN) User Part (ISUP) call-setup protocol. The ISUP call-setup protocol is described in the Bellcore standards, "TR-NWT-000317. Switching System Generic Requirements for Call Control Using the Integrated Services Digital Network User Part (ISDNUP)", "TR-NWT000394, Switching System Generic Requirements for Interexchange Carrier Interconnection Using the Integrated Services Digital Network User Part (ISDNUP)", and "TR-NWT000444, Switching System Requirements Supporting ISDN Access Using the ISDN User Part", which are hereby incorporated by reference.

The monitors on the CCIS links to a specified SSP may be programmed to trap selected call set up messages which inquire as to the availability of a line. The same monitors may be programmed to trap call set up messages which inquire as to the availability of a line and indicate that it is not available. Set up signals which indicate unavailability, such as in the case of a busy line, comprise one indication of the maximum load on the available voice circuits. Such a condition may be relieved by the provision of additional lines from the end office to the Internet server. However it is desired to minimize overloading with the existing network and thus when the occurrence of line busy conditions approaches or exceeds a pre-specified parameter it may provide an indication of the approach of an unacceptable degree of congestion in the voice circuits. The monitors provide an output to an event detection center (EDC) processor having an SSP capability which is linked to the STPs. As described above, the STPs maintain a continuous check on the load status of the CCIS SS7 network and the link to the EDC makes this information available to the EDC. According to one embodiment of the invention, the event detection center processor reacts to the trapped information to block or control (such as diverting) specified calls via CCIS control signals to the CCIS network after ascertaining that usable capacity exists in that network. According to another feature of the invention, the event control processor communicates with the monitors either via the STP CCS links or via connection to a controller for the monitors. In this manner it is possible to predict the development of a traffic overload in one type of circuit, the normal voice circuits, and to divert some or all of that traffic into a different type of network in a unique manner to avoid the actual occurrence of the undesired situation. The different network, i.e., the CCIS network, thus acts to perform the multiple functions of handling conventional CCIS network control, activating the monitor network to provide warning signals, acting on warning signals from the monitor network control to direct diversionary switching through CCIS signaling, and then transporting the diverted signals via the CCIS network.

Another feature of the invention lies in the fact that no diversion of signals onto the CCIS network will occur if there exists a possibility that the addition of such diverted signals would cause an overload on the CCIS network.

Figure 16:
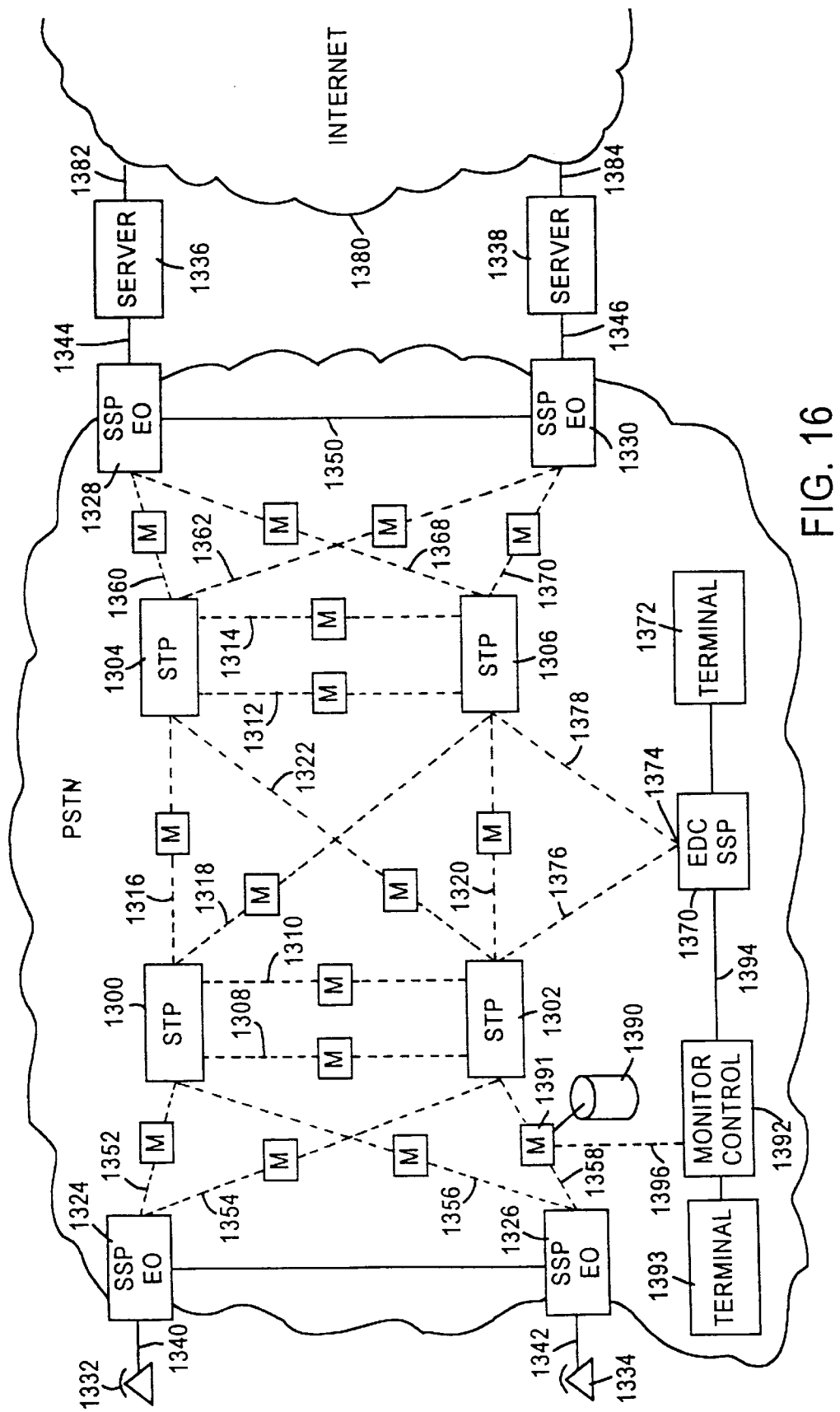
FIG. 16 shows in detail a Public Switched Telephone Network (PSTN) common channel interoffice signaling (CCIS) network and associated monitor network arranged according to one preferred embodiment of the invention.

FIG. 16 is a simplified block diagram of the common channel signaling control network for a switched telecommunications system showing a portion of the common channel signaling system as utilized, for example, in a PSTN such as PSTN-A or PSTN-B in FIG. 1. The telephone stations and Internet modules or servers in FIG. 16 are disposed in such a manner that the PSTN in FIG. 16 may be most readily visualized in the disposition of PSTN-A in FIG. 1. Referring to FIG. 16, the common channel signaling or AIN network is shown as including a first mated pair of STPs 1300–1302 and a second mated pair of STPs 1304–1306. The mated pairs of STPs are connected to one another by C links 1308, 1310, 1312, and 1314. Each mated pair serves its respective transport area. It will be understood that there may be multiple mated pairs per region and per PSTN cloud in the drawings, one for each designated transport area. STP 1300 is connected to STP 1304 by B link 1316 and to STP 1306 by D link 1318. STP 302 is connected to STP 306 by B link 320 and to STP 304 by D link 1322. The STPs are connected to SSPs 1324, 1326, 1328, and 1330. The SSPs 1324–1330 comprise End Offices (EOs) having SS7 signaling capability or TCAP/AIN communications protocol capability. Subscriber telephone stations 1336 and 1338 are connected to the end offices 1328 and 1330 by voice lines 1344 and 1346. The SSPs 1332, 1334, 1328, and 1330 are connected together by illustrative trunks shown at 1348 and 1350. The SSPs are connected to the STPs by A links 1352–1368.

As previously pointed out, the SS7 network constitutes a highly redundant data network, generally a 56 K switched data circuit. By way of example, an SS7 message from end office 1324 to end office 1328 might travel any one of eight possible routes. It could go from 1324 to STP 1300, from STP 1300 to STP 1304, STP 1304 to SSP or EO 1328. One variation on that route would be from STP 1300 down the D link 1318 to STP 1306 to SSP/EO 1330, and so forth. In the event a link between STP 1300 and SSP/EO 1328 was lost, an SS7 route could be established from end office 1324 to SSP/EO 1330 via STP 1300 to STP 1304 and the via C link 1312 to STP 1306 and then via A link 1370 to SSP/EO 1330. However, that would be an undesirable route unnecessarily using the C link. A links provide direct connectivity while C links provide circuitous routes using extra switches, a situation to be avoided. An alternate route would be from STP 1300 via D link 1318 to STP 1306 via A link 1370 to SSP/EO 1330.

According to this embodiment of the invention an Event Detection Center (EDC) 1370 is connected to the common channel signaling network via an SSP 1374 and A links 1376, 1378. The EDC includes a processor and storage and operator terminal 1372. Each STP is provided with a series of monitors M with one monitor bridged onto each STP link, each monitor having receive and transmit ports. As pointed out hereinabove, and as will be understood by those skilled in the art, each SSP has a point code comprising a nine-digit code assigned to every node in the network. Each operating company has its own network ID normally represented by three digits in the point code. The point code also contains a three-digit cluster number. A cluster can hold 32 SSPs, the SSPs being designated by the final three numbers. According to this aspect of the invention the monitors M are addressable and have individual point codes for control and programming purposes.

The monitors include processors and temporary storage as indicated by way of example at 1390 connected to the monitor M 1391 in FIG. 16. It will be understood that each of the remaining monitors M includes a similar processor and storage. Each of the monitors in a cluster for an STP is connected to a monitor controller 1392. The controller 1392 includes a processor and storage and may be provided with a terminal 1393. The monitors and processors may be of the type described in Eugene M. Pester III U.S. Pat. No. 5,475,732, issued Dec. 12, 1995, and assigned to the assignee of the instant application. That Pester Patent is incorporated by reference herein in its entirety.

As described in further detail in the aforesaid Pester Patent, the monitors are controllable from remote stations to set traps which may be customized. Thus the monitors are programmed to trap packets and/or selectable fields and/or field contents on a real time basis to permit extremely rapid response to detected conditions. The system and method of this aspect of the invention are applicable to not only a localized or regional communications network but also to a virtually unlimited interconnection of such networks. The monitors may comprise the monitor circuit card physically mounted at a monitor controller 1392 that holds all monitor cards for that cluster. The monitor controller includes a 486 or 586 or the like type controller and memory or storage that keeps track of all 32 monitors and handles any messages.

The controller 1392 and its monitors M may be regarded as an interface with the SS7 network. The equipment may be conveniently mounted at or adjacent to the STP with which the monitors are associated. A function of the monitor controller is recording all of the data forwarded by the monitors M.

The controller 1392 may be similar to the stage one controller described in the aforesaid Pester Patent. The controller 1392 is connected to the event detection center 1370 via a data link 1394. The monitors may physically constitute a back plane capable of handling multiple cards. The monitor cards themselves include multiple monitors such as four monitors per card. According to the invention the monitors may be programmed by monitor control signals delivered either via the SS7 or CCIS network or via the data link between each monitor M and its associated monitor controller 1392. In the first instance control signals may be delivered to specifically addressed monitors over the CCS links 1376 and 1378 in FIG. 16. In the latter instance the control signals are delivered over the line 1394 connecting the EDC 1370 to the monitor controller 1392 and thence over the data link 1396 from the monitor controller 1392 to the processor and storage 1390.

The processor in the event detection center 1370 may be loaded with the desired program or script via the terminal 1372. This script will specify for identified monitors the particular signals or portions of signals to be trapped and the nature of the output signal to be delivered to the monitor controller 1392. The monitor controller receives this designated information from all specified monitors in its cluster and provides an output signal to the event detection center processor 1370 upon the occurrence of predetermined conditions as specified by the event detection center processor. The event detection processor in turn responds to the receipt of these output signals from the monitor controller by directing to the SS7 or CCS network over the links 1376, 1378 routing or other control information direct the handling of predetermined calls.

Figure 17:
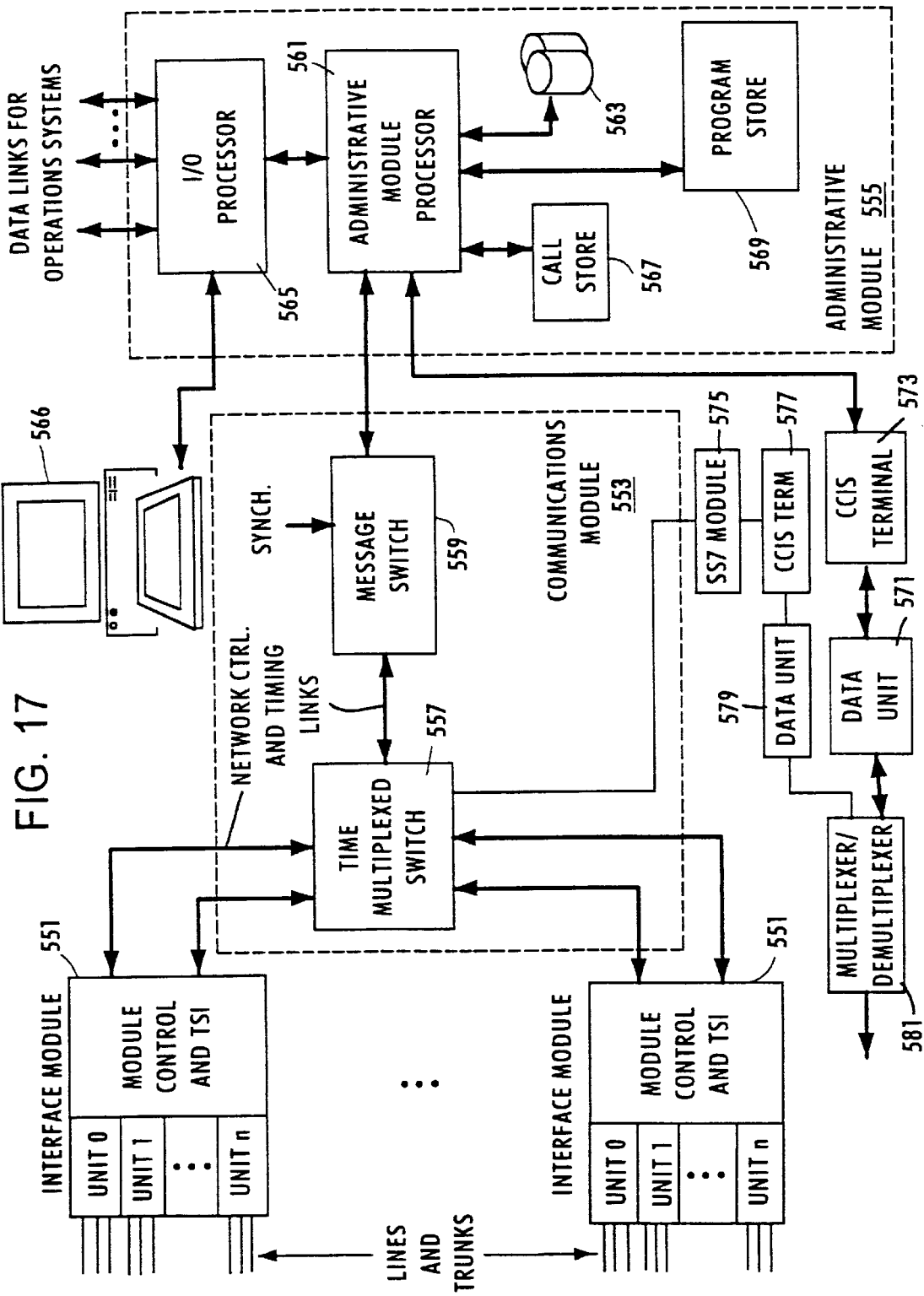
FIG. 17 shows a simplified block diagram of an electronic program controlled switch which has been modified to serve as an SSP type central end office in the system of FIG. 16.

Referring to FIG. 17 there is shown a program controlled switch of the type previously described with reference to FIG. 3. The switch in FIG. 17 has been modified to implement one methodology of the invention in a network of the type shown in FIGS. 1 and 16. In this switch the Time Multiplexed Switch is connected to an SS7 Module 575. The SS7 module performs compression and decompression and SS7 processing. This SS7 processing is similar to and a counterpart to the Internet processing that occurs in the Internet module shown in FIG. 5, which is used in the network of FIG. 4. As described above the Internet module implements the function of a packet assembler and disassembler or PAD and assembles packets in TCP/IP format. The packets bear the source and destination IP addresses and the digitized speech payload. The packets are dispatched from the originating router onto the Internet and are delivered to the destination router and Internet Module.

The SS7 module 575 also implements the function of a packet assembler and disassembler or PAD and assembles packets in SS7 format. The packets bear the source and destination SS7 addresses and the digitized speech payload. The packets are dispatched from the originating SSP onto the SS7 network and are delivered to the destination SSP and Internet server, such as the server 72 in FIG. 1 and the server 1336 in FIG. 16.

The SS7 module in FIG. 17 is connected to a CCIS terminal 577, data unit 581, and multiplexer/demultiplexer 581. The CCIS terminal 577 is similar to the CCIS terminal 573, and the data unit 579 is similar to the data unit 571. The multiplexer/demultiplexer multiplexes and demultiplexes the packet streams to and from the data units 571 and 581. The output of the multiplexer/demultiplexer is delivered to the STPs and SS7 network.

Following is an illustrative example of one mode of traffic control according to this embodiment of the invention. The operator terminal 1372 may be used for programming the EDC processor. According to one illustrative example, the processor may be programmed to implement the following script or program:

1. Identify the ISP or Telco server to which overload protection is to be implemented. In this example it will be assumed that server 1336 in FIG. 16 is to be protected.
2. Identify the SS7 or CCIS links to the SSP/EO to which that server is connected and identify the addresses of the monitors on those links. In this example those would be the monitors on links 1360 and 1368.
3. Send monitor set up signals from the EDC computer via either the SS7 /CCIS links or the monitor controller to the identified addressed monitors on the specified links.
4. Through such set up signals program those monitors to trap data signals on the specified links which are caused by a call initiation request signal (IAM) requesting a connection to the designated server. The trapped signals will be stored in the temporary storage associated with the monitors.

5. Program the monitors and monitor controller to send to the monitor controller those stored signals which represent IAM signals which encountered a busy condition on the local link 1344 to the server 1336.
6. Set a threshold limit for such busy conditions per time period, i.e., the rate at which such signals are received. When that threshold is reached, the monitor control sends to the event detection control (EDC) a message to take load reduction action.
7. When the EDC receives a signal that load reduction action is indicated it will check the availability of SS7 network capacity to handle overload.
8. Set an SS7 network available capacity threshold which is necessary to permit diversion of signals onto the SS7 network. The links 1376 and 1378 from the EDC to the STPs provide the EDC with a continuous indication of SS7 network load conditions.
9. When the EDC receives a signal that load reduction action is indicated and the EDC has determined that excess capacity is available in the SS7 network, it will broadcast a message to all SSP/EOs in PSTN-A. Upon receiving this message each SSP/EO sets its program to switch incoming calls bearing an Internet prefix to the SS7 network. This condition of the switches is maintained until a reset signal restores the switches to their former condition.
10. Once the monitor control signals the EDC that the IAM/busy signal threshold has been reached, the monitor control periodically checks its storage to determine if the threshold was reached during the latest predetermined time period. When the monitor control determines that the rate of arrival of IAM/busy signals has dropped below the threshold, it sends a message to the SSP/EOs to reset their programs to discontinue switching incoming Internet calls to the SS7 network.

The operation of the system and method of the invention pursuant to this programming is illustrated in one example in the flow diagrams of FIGS. 18A through 18D.

In this example an Internet connection is used to link a calling to a called telephone without the necessity of either party possessing or using personal or office computer equipment. The subscriber in this example uses the POTS station at 56 to initiate an Internet call to a called party at the POTS station 58 in FIG. 1. The caller goes off-hook and dials *82. This prefix has been established by the Telco offering the service as a predesignated prefix with which the public may initiate an Internet telephone call through a Telco Internet server. It is assumed that the Telco Internet server in this example is the server 72 in FIG. 1 and server 1336 in FIG. 16. The dialing of the prefix *82 is followed by the dialing of the directory number of the called party at the station 58. This is shown in step S1.

At step S2 the central office SSP/EO 50 in FIG. 1 and 1324 in FIG. 16, responds to the off-hook and receives the dialed digits from the calling station. At step S3 the SSP/EO switching system analyzes the received digits and determines from the prefix *82 that the call is an Internet call. Responsive to its programming it knows that the call must be completed through a remote central office and that further processing is necessary. At step S4 the originating SSP/EO central office suspends the call and at step S5 sends a CCIS query message through one or more of the STPs.

The query message goes to the SSP/EO 50A in FIG. 1 and to SSP/EO 1328 in FIG. 16, the central office to which the designation Internet server is connected. The queried or designation SSP/EO 50A receives the query and determines at step S6 whether or not the local link to the called server at 50A is busy. If the called server line is busy, the receiving SSP/EO 50A so informs the originating SSP/EO 50 via an SS7 signal at step S7. At step S8 the originating central office provides a busy signal to the calling station.

When the receiving or destination SSP/EO 50A notifies the originating SSP/EO 50 that the server line is busy, this SS7 signal is noted by the monitor on the SS7 link on which that signal traveled. This would be one of the links 1360 or 1368 in FIG. 16. The initial inquiry to the destination SSP/EO and the busy response would be trapped by that monitor pursuant to its programming. This is shown at step S9. Also pursuant to that programming the monitor would send request and busy signal sequence signals to the monitor control 1392 in FIG. 16. This is shown at step S10. The monitor control maintains a timed record of the number of request/busy signals received and increments that store at step S11. At step S12 the monitor control ascertains whether the addition of the latest count reaches the predetermined threshold rate for such signals. If the threshold has not been reached the count is maintained but no action taken at step S13. If the threshold has been reached the monitor control signals the EDC to that effect at step S14. Upon receiving such notification the EDC checks for the availability of SS7 network capacity at S15. If such capacity is not available no action is taken.

If excess capacity exists on the SS7 network the EDC broadcasts a message to all SSP/EOs in PSTN-A. This is shown at step S16. Upon receiving this message each SSP/EO sets its program to switch incoming calls bearing the Telco Internet prefix to the SS7 network. This is shown at step S17. This condition of the switches is maintained until a reset signal restores the switches to their former condition.

Figure 18A:
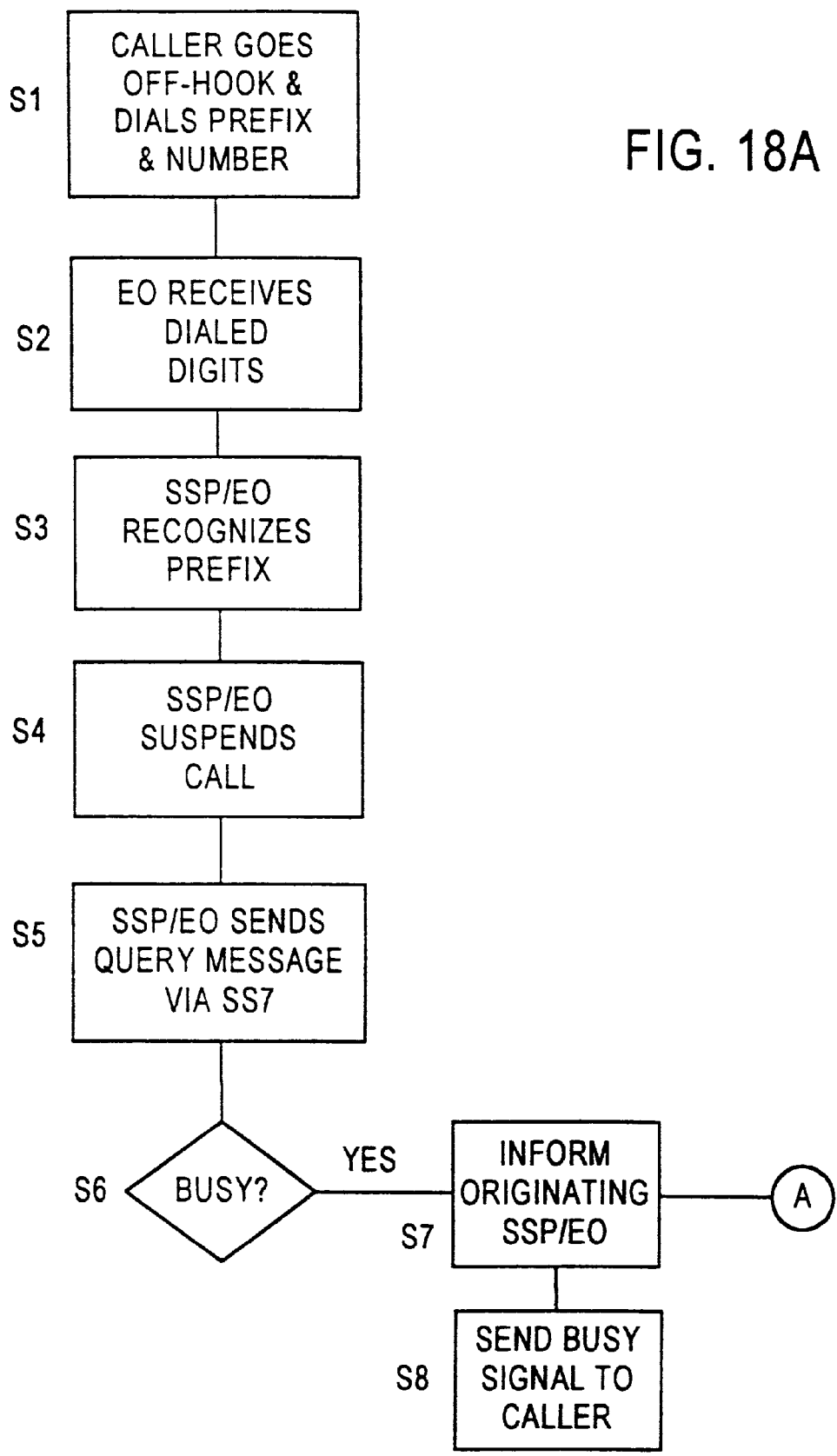
FIGS. 18A, 18B, 18C, and 18D illustrate in flow diagrams one mode of operation of the embodiment of the invention shown in FIG. 1.
Figure 18B:
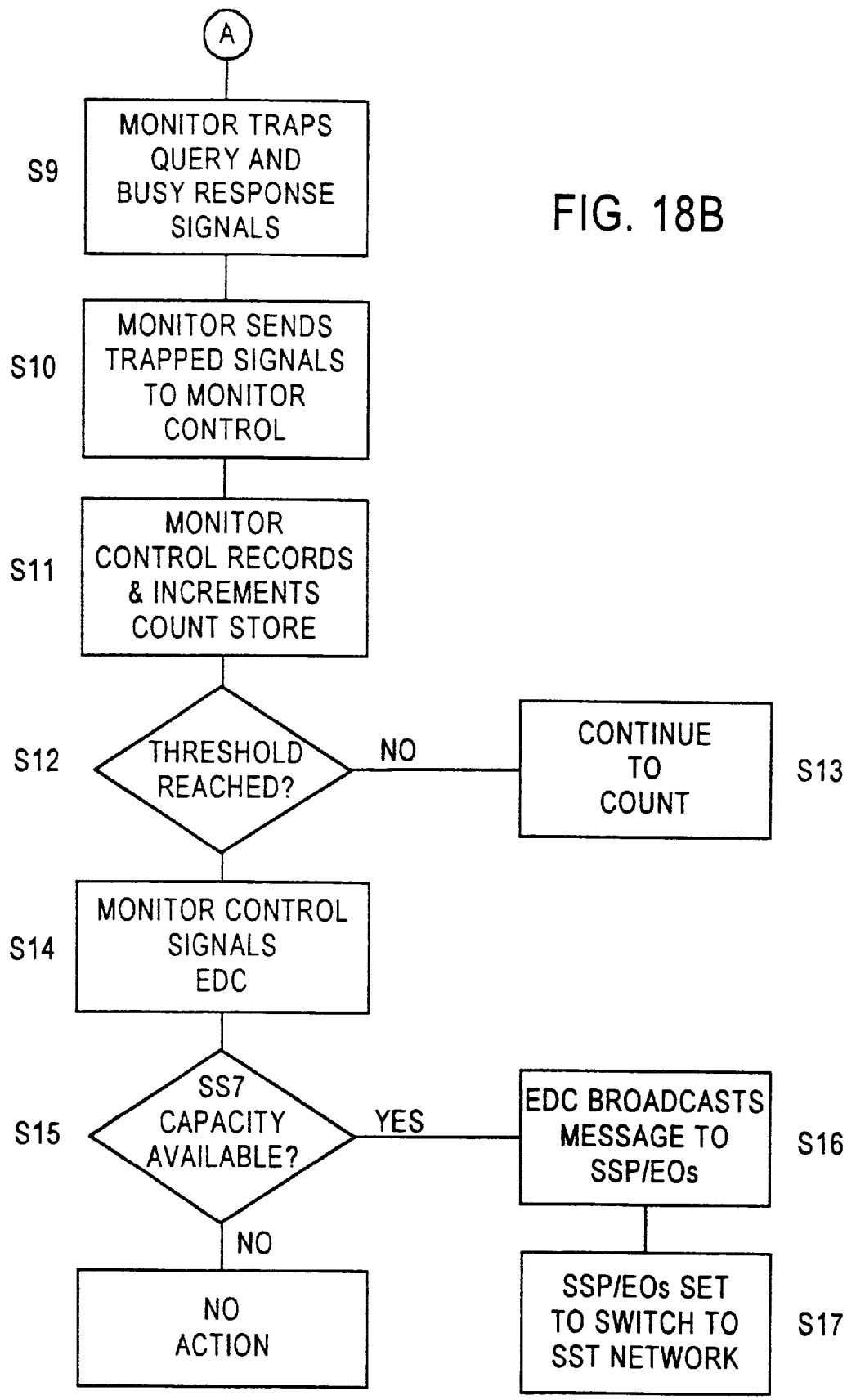
Figure 18C:
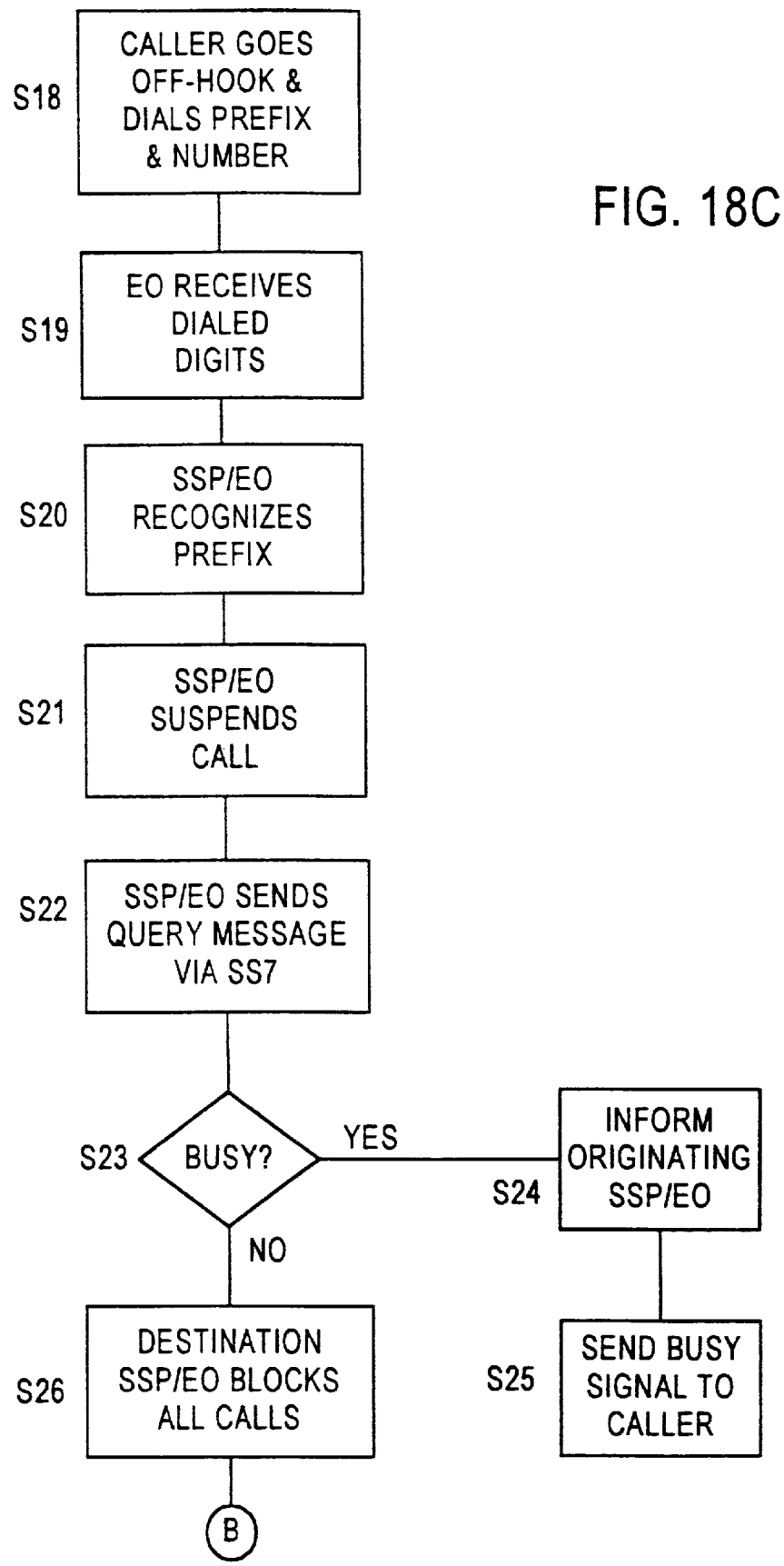
Figure 18D:
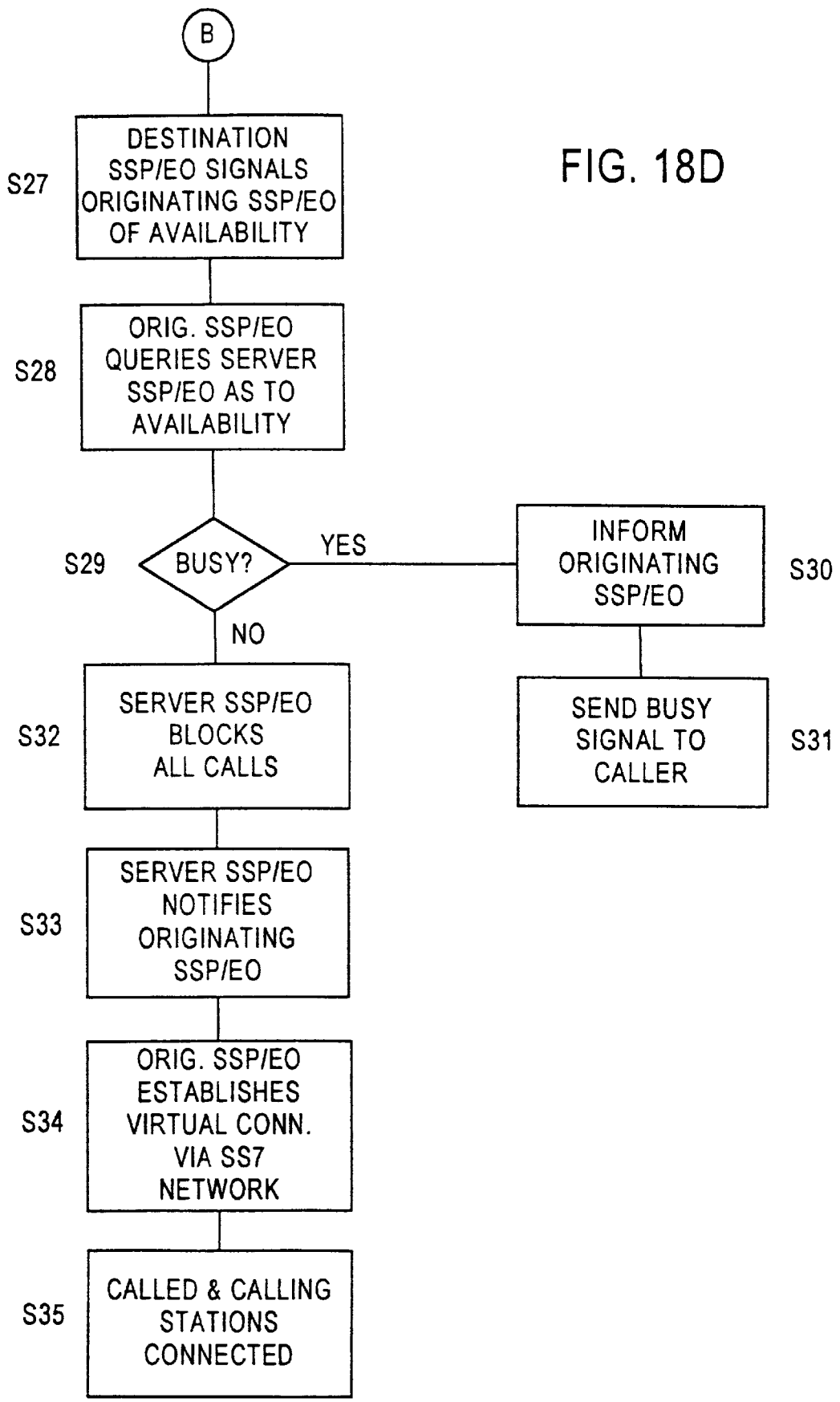

FIGS. 18C and 18D show the sequence for an Internet telephone call which is made after the switches have been set to divert Internet telephone calls to the SS7 network.

At step S18 the caller goes off-hook and dials *82.

At step S19 the central office SSP/EO 50 in FIG. 1 and 1324 in FIG. 16, responds to the off-hook and receives the dialed digits from the calling station.

At step S20 the SSP/EO switching system analyzes the received digits and determines from the prefix *82 that the call is an Internet call.

At step S21 the originating SSP/EO central office suspends the call and at step S22 sends a CCIS query message through one or more of the STPs. However this query is directed to the ultimate destination SSP/EO 52 in FIG. 1, which was identified by the destination number initially dialed by the calling party. The message traverses the SS7 network between the two PSTNs PSTN-A and PSTN-B. This network is shown by the link 75 in FIG. 1.

The ultimate destination SSP/EO 52 receives the query and determines at step S23 whether or not the called station at 58 is busy. If the called station is busy, the ultimate destination SSP/EO 52 so informs the originating SSP/EO 50 at step S24.

At step S25 the originating SSP/EO 50 provides a busy signal to the calling station 56.

If the called station is not busy, the receiving ultimate destination SSP/EO 52 busies out the called station line by blocking all calls at step S26.

The receiving or ultimate destination SSP/EO 52 then informs the originating SSP/EO 50 office that the called line is available and waiting and that the server 72 connected to SSP/EO 50A may be reached through the PSTN via the SS7 network to which the SSP/EO 50 was switched in step S17. This is shown at step S27.

At step S28 the originating SSP/EO 50 queries the destination SSP/EO 50A as to the availability of the line to the server 72. At step S29 the determination is made as to whether or not the called server 72 is busy. If the called server is busy, the receiving SSP/EO 50A so informs the originating SSP/EO 50 at step S30. At step S31 the originating SSP/EO 50 provides a busy signal to the calling station.

If the desired SSP/EO 50A is not busy, the receiving SSP/EO 50A busies out the called server line by blocking all calls at step S32.

The receiving SSP/EO 50A then informs the originating SSP/EO 50 that the server 72 line is available and waiting at step S33.

At step S34 the originating SSP/EO 50 receives this message and a virtual connection of the two SSP/EOs 50 and 50A is established through the SS7 network.

At step S35 a connection to the called telephone station 58 is established via the SS7 network in PSTN-A, the Internet, and PSTN-B.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A communication network system comprising in combination:
    a switched telephone network having a plurality of central office switching systems and having first and second subscriber stations connected by local links to first and second of said central office switching systems, said central office switching systems switching communication signals in a telephone network first protocol through said telephone network;
    a separate control network for said switched telephone network, said control network transporting control signals having a second protocol for selectively establishing connection between said central office switching systems;
    a packet switched data internetwork coupled to said switched telephone network via a server, said first subscriber station connected to said first central office switching system, said server translating a third data signal protocol used in said packet switched data internetwork to and from said telephone network first protocol;
    a load control processor coupled to said separate control network for said switched telephone network and directing the transport of communication signals between a subscriber station connected to said second central office switching system and said first central office switching system connected to said server, said transport being directed over either said switched telephone network or over said separate control network;
    wherein said load control processor directs the transport of said communication signals between a subscriber station connected to said second central office switching system and said first central office switching system connected to said server over either said switched telephone network or over said separate control network in response to determination of the load in said switched telephone network.

2. A communication system according to claim 1 wherein said packet switched data network comprises the Internet.

3. A communication system according to claim 1 wherein said separate control network comprises a common channel interoffice signaling (CCIS) system using Signaling System 7 (SS7) and said control signals in said second protocol comprise SS7 signals.

4. A communication system according to claim 1 including first and second separate control network servers coupled between said first and second central office switching systems and spaced nodes in said separate control network; said first and second control network servers translating said second protocol used in said separate control network to and from said telephone network protocol.

5. A communication system according to claim 4 wherein said second protocol is signaling system 7 (SS7) protocol.

6. A communication system according to claim 5 wherein said telephone network protocol is a r carrier protocol.

7. A communication system according to claim 1 including monitors coupled to links in said separate control network and coupled to said load control processor, said monitors providing signals to said load control processor indicative of the load in said switched telephone network.

8. A communication network system comprising in combination:
    a first switched telephone network having a plurality of subscriber stations connected thereto by local links to central office switching systems in said first switched telephone network, said central office switching systems switching communication signals of a first protocol through said telephone network;
    a first separate control network for said first switched telephone network, said first control network transporting control signals having a second protocol for selectively establishing connection between said subscriber stations;
    a second switched telephone network having a plurality of subscriber stations connected thereto by local links to central office switching systems in said second switched telephone network;
    a packet switched data internetwork coupled to said first and second switched telephone networks via first and second servers, said servers translating a third data signal protocol used in said packet switched data internetwork to and from said first protocol;
    a load control processor coupled to said first separate control network for said first switched telephone network and directing the transport of communication signals between a subscriber station connected to a first central office switching system in said first telephone network and a first of said first and second servers over either said first switched telephone network or over said separate control network;
    wherein said load control processor directs the transport of said communication signals between a subscriber station connected to said second central office switching system and said first central office switching system connected to said server over either said switched telephone network or over said separate control network in response to determination of the load in said switched telephone network.

9. A communication system according to claim 8 wherein said packet switched data network comprises the Internet.

10. A communication system according to claim 8 wherein said separate control network comprises a common channel interoffice signaling (CCIS) system using Signaling System 7 (SS7) and said control signals in said second protocol comprise SS7 signals.

11. A communication system according to claim 8 including first and second separate control network servers coupled between said first and second central office switching systems and spaced nodes in said control network; said first and second separate control network servers translating said second protocol used in said control network to and from said first protocol.

12. A communication system according to claim 11 wherein said second protocol is signaling system 7 (SS7) protocol.

13. A communication system according to claim 12 wherein said first protocol is a T carrier protocol.

14. A communication system according to claim 8 including monitors coupled to links in said separate control network and coupled to said load control processor, said monitors providing signals to said load control processor indicative of the load in said switched telephone network.

15. A method of transporting a voice signal over a combination of concatenated networks including a switched telephone network having a separate packet switched control network and a packet switched data internetwork comprising the steps of:
   a) determining the traffic load in the switched telephone network to the packet switched data internetwork;
   b) responsive to the determined load switching at least a portion of subsequent traffic directed to and from the packet switched data internetwork to the separate packet switched control network.

16. A method according to claim 15 wherein said packet switched data internetwork comprises the Internet.

17. A method according to claim 16 wherein said separate packet switched control network comprises a common channel interoffice signaling (CCIS) network using signaling system 7 (SS7).

18. A method according to claim 17 wherein said traffic load in said switched telephone network is determined by monitoring call set up signals in the CCIS SS7 network.

19. A method according to claim 15 including the step of translating the voice signal to SS7 protocol.

20. A method according to claim 17 including the steps of translating the voice signal to a T carrier protocol and translating the T carrier protocol to SS7 protocol.

21. A method according to claim 20 including the step of translating the SS7 protocol signal carrying the voice signal back to T carrier protocol and translating the T carrier protocol signal to TCP/IP protocol.

22. A method according to claim 21 including the steps of transporting the TCP/IP signal carrying the voice through said packet switched data internetwork, translating the TCP/IP signal which was transported through said packet switched data internetwork to T carrier protocol, and translating said last named T carrier protocol signal to analog voice.

23. A method according to claim 21 including the steps of transporting the TCP/IP signal carrying the voice through said packet switched data internetwork, translating the TCP/IP signal which was transported through said packet switched data internetwork to T carrier protocol, and delivering said last named T carrier protocol signal via a second switched telephone network.

24. In a communication network system comprising in combination:
   a switched telephone network having a plurality of central office switching systems and having first and second subscriber stations connected by local links to first and second of said central office switching systems, said central office switching systems switching telephone network protocol communication signals through said telephone network;
   a separate control network for said switched telephone network, said control network transporting control signals having a second protocol for selectively establishing connection between said central office switching systems;
   a packet switched data internetwork coupled to said switched telephone network via a server comprising said first subscriber station connected to said first central office switching system;
   a method comprising the steps of:
      a) determining the traffic load in said switched telephone network to the packet switched data internetwork;
      b) responsive to the determined load switching at least a portion of subsequent traffic directed to the packet switched data internetwork to the separate packet switched control network;
      c) translating said switched subsequent traffic to said second signal protocol used in said separate control network;
      d) further translating said switched subsequent traffic in said second signal protocol to telephone network protocol; and
      e) delivering said further translated subsequent traffic to said server in said telephone network protocol.

25. In a communication network system comprising in combination:
   a switched telephone network having a plurality of central office switching systems and having first and second subscriber stations connected by local links to first and second of said central office switching systems, said central office switching systems switching telephone network protocol communication signals through said telephone network;
   a separate control network for said switched telephone network, said control network transporting control signals having a second protocol for selectively establishing connection between said central office switching systems;
   a packet switched data internetwork coupled to said switched telephone network via a server comprising said first subscriber station connected to said first central office switching system;
   a method comprising the steps of:
      a) determining the traffic load in said switched telephone network to the packet switched data internetwork;
      b) responsive to the determined load switching at least a portion of subsequent traffic directed to the packet switched data internetwork to the separate packet switched control network;
      c) translating said switched subsequent traffic to said second signal protocol used in said separate control network;
      d) multiplexing said subsequent traffic in second signal protocol with control signals in said second signal protocol in said separate control network;

e) demultiplexing said subsequent traffic in second signal protocol;

f) translating said demultiplexed subsequent traffic in said second signal protocol to telephone network protocol; and g) delivering said demultiplexed and translated subsequent traffic to said server in said telephone network protocol.

26. A method of transporting a voice signal over a combination of concatenated networks including a switched telephone network having a separate packet switched control network and a packet switched data internetwork comprising the steps of:

a) determining the traffic load in the switched telephone network to the packet switched data internetwork;

b) responsive to the determined load switching at least a portion of subsequent traffic directed to and from the packet switched data internetwork to the separate packet switched control network, and c) multiplexing said switched subsequent traffic with control signals in said separate packet switched control network.

27. A method according to claim 26 including the step of determining that the separate packet switched network has available capacity for transporting said subsequent traffic before switching said traffic.

28. A communication network system comprising in combination:

a switched telephone network having a plurality of central office switching systems and having first and second subscriber stations connected by local links to first and second of said central office switching systems, said central office switching systems switching communication signals in a telephone network protocol through said telephone network;

a separate control network for said switched telephone network, said control network transporting control signals having a second protocol for selectively establishing connection between said central office switching systems;

a packet switched data internetwork coupled to said switched telephone network via a server comprising said first subscriber station connected to said first central office switching system, said server translating a third data signal protocol used in said packet switched data internetwork to and from said telephone network protocol;

a load control processor coupled to said separate control network for said switched telephone network and directing the transport of communication signals between a subscriber station connected to said second central office switching system and said first central office switching system connected to said server, said transport being directed over said separate control network following a determination that said separate control network has sufficient available capacity to transport said communication signals.

29. A communication system for transporting a voice communication call, dialed as an Internet directed call at a calling subscriber telephone station, to a remote dialed destination subscriber telephone station via the Internet, comprising:

a switched telephone network comprising a plurality of central office switching systems connectable to each other through voice communication links, a first of said central office switching systems connected to said calling subscriber telephone station and a second of said central office switching systems interfacing with an Internet server;

a separate control signaling data network for said switched telephone network operative to establish connection between said central office switching systems;

a load monitor connected to said separate control signaling network; and a load control processor coupled to said separate control network and operative to direct the transport of voice communication signals for said dialed Internet directed call between said first and second central office switching systems through said separate control signaling network when said load monitor indicates traffic therein is within a set load threshold, wherein routing of said call bypasses said switched telephone network voice communication links.

* * * * *